US011565769B2

(12) United States Patent
Lechevallier et al.

(10) Patent No.: US 11,565,769 B2
(45) Date of Patent: Jan. 31, 2023

(54) 3-POSITION BATTERY LATCHING SYSTEM

(71) Applicant: Specialized Bicycle Components, Inc., Morgan Hill, CA (US)

(72) Inventors: Robin François Ramon Lechevallier, Cham (CH); Rudy Megevand, Oberageri (CH); Marco Werner Sondereger, Benzenschwil (CH); David Huwiler, Baar (CH); Daniel Draffehn, Mettmenstetten (CH); Jan Talavasek, Kronau (CH)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 186 days.

(21) Appl. No.: 17/118,962

(22) Filed: Dec. 11, 2020

(65) Prior Publication Data
US 2022/0185428 A1   Jun. 16, 2022

(51) Int. Cl.
*B62M 6/90*    (2010.01)
*B62H 5/00*    (2006.01)
(Continued)

(52) U.S. Cl.
CPC ............... *B62M 6/90* (2013.01); *B62H 5/001* (2013.01); *B62J 43/13* (2020.02); *B62M 6/40* (2013.01); *B62J 43/28* (2020.02)

(58) Field of Classification Search
CPC .................................. B62J 43/28; B62J 43/13
(Continued)

(56) References Cited

U.S. PATENT DOCUMENTS 6,016,882 A   1/2000  Ishikawa
6,973,987 B2  12/2005 Damon
(Continued)

FOREIGN PATENT DOCUMENTS

DE    202005018897 U1   2/2006
DE    102009052525 A1   5/2011
(Continued)

OTHER PUBLICATIONS

European Patent Office, Extended European Search Report for application 21213609.7, dated May 10, 2022, 7 pages.

*Primary Examiner* — Kevin Hurley
*Assistant Examiner* — Hosam Shabara
(74) *Attorney, Agent, or Firm* — Michael Best & Friedrich LLP

(57) ABSTRACT

An ebike includes a front wheel, a rear wheel, a frame assembly supported on the front wheel and the rear wheel, a battery, and a battery latching assembly to secure the battery to the frame assembly. The battery latching assembly includes a latch member movable among (1) a secured position in which the latch member is configured to secure the battery in a fully mounted position, (2) an open position in which the latch member is configured to maintain the battery in a partially mounted position, and (3) a released position in which the latch member is configured to release the battery. The battery latching assembly also includes a release member coupled to the latch member and movable among (1) a first position in which the latch member is maintained in the secured position, (2) a second position in which the latch member is maintained in the open position and (3) a third position in which the latch member is maintained in the release position.

21 Claims, 20 Drawing Sheets

(51) Int. Cl.
  *B62J 43/13* (2020.01)
  *B62J 43/28* (2020.01)
  *B62M 6/40* (2010.01)
(58) Field of Classification Search
  USPC ........................................................ 180/220
  See application file for complete search history.

(56) References Cited

U.S. PATENT DOCUMENTS

| | | |
|---|---|---|
| 7,267,352 B2 | 9/2007 | Ishikawa |
| 7,357,206 B2 | 4/2008 | Fobean |
| 7,726,427 B2 | 6/2010 | Picavet |
| 8,162,191 B2 | 4/2012 | Tetsuka et al. |
| 8,651,212 B2 | 2/2014 | Vincenz |
| 8,727,367 B2 | 5/2014 | Talavasek et al. |
| 8,936,124 B2 | 1/2015 | Auer et al. |
| 8,979,110 B2 | 3/2015 | Falavasek et al. |
| 9,248,792 B2 | 2/2016 | Kawatani et al. |
| 9,260,157 B2 | 2/2016 | Chu et al. |
| 9,399,499 B2 | 7/2016 | Honda et al. |
| 9,580,141 B2 | 2/2017 | Falavasek et al. |
| 9,758,030 B2 | 9/2017 | Newman |
| 9,914,501 B2 | 3/2018 | Marioni |
| 10,170,737 B2 * | 1/2019 | Shimoda .............. H01M 50/20 |
| 10,183,591 B2 | 1/2019 | Shieh |
| 2008/0268330 A1 | 10/2008 | Hansen et al. |
| 2012/0111654 A1 | 5/2012 | Origuchi |
| 2016/0288875 A1 | 10/2016 | Fujiwara |
| 2018/0043966 A1 | 2/2018 | Cunado Landa et al. |
| 2018/0151860 A1 | 5/2018 | David et al. |
| 2018/0342718 A1 | 11/2018 | Iacovoni et al. |
| 2019/0061863 A1 * | 2/2019 | Lee .......................... B62J 43/20 |
| 2019/0097194 A1 | 3/2019 | Hirsch et al. |
| 2019/0229307 A1 | 7/2019 | Mitsuyasu et al. |
| 2019/0337587 A1 | 11/2019 | den Hertog |
| 2021/0126230 A1 * | 4/2021 | Liu .......................... B62M 6/90 |
| 2022/0161891 A1 | 5/2022 | Bock et al. |

FOREIGN PATENT DOCUMENTS

| | | |
|---|---|---|
| DE | 102011083031 A1 | 8/2012 |
| DE | 102014108460 A1 | 12/2015 |
| DE | 102015201286 A1 | 7/2016 |
| DE | 202016104156 U1 | 9/2016 |
| DE | 102018005331 A1 | 1/2019 |
| DE | 102018117819 A1 | 1/2019 |
| DE | 102018006689 A1 | 2/2019 |
| DE | 102019204572 B3 | 8/2020 |
| EP | 0686522 B1 | 12/1998 |
| EP | 1092826 B1 | 8/2003 |
| EP | 2112060 B1 | 10/2009 |
| EP | 2759465 A1 | 7/2014 |
| EP | 2541640 B1 | 1/2019 |
| FR | 2779010 B1 | 8/2000 |
| FR | 3046401 B1 | 1/2018 |
| JP | H10181651 A | 7/1998 |
| JP | 2001106136 A | 4/2001 |
| TW | 1714178 B * | 12/2020 |
| WO | 2012123455 A1 | 9/2012 |
| WO | 2017009637 A1 | 1/2017 |
| WO | 2018016949 A1 | 1/2018 |
| WO | 2018019441 A1 | 2/2018 |
| WO | 2018069035 A1 | 4/2018 |
| WO | 2019068579 A1 | 4/2019 |
| WO | 2019155482 A1 | 8/2019 |

* cited by examiner

3-POSITION BATTERY LATCHING SYSTEM

BACKGROUND

The present disclosure relates to latching systems for batteries, and specifically to latching systems for ebike batteries.

DETAILED DESCRIPTION

Before any constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

According to an exemplary embodiment, an ebike comprises a front wheel, a rear wheel, and a frame assembly supported on the front wheel and the rear wheel. The ebike also comprises a battery configured to be coupled to the frame assembly, and a battery latching assembly configured to secure the battery to the frame assembly. The battery latching assembly comprises a latch member movable among (1) a secured position in which the latch member is configured to secure the battery in a fully mounted position, (2) an open position in which the latch member is configured to maintain the battery in a partially mounted position, and (3) a released position in which the latch member is configured to release the battery. The battery latching assembly also comprises a release member coupled to the latch member and movable among (1) a first position in which the latch member is maintained in the secured position, (2) a second position in which the latch member is maintained in the open position and (3) a third position in which the latch member is maintained in the released position.

According to another exemplary embodiment, an ebike comprises a front wheel and a rear wheel, and a frame assembly supported on the front wheel and the rear wheel. The frame assembly includes a hook including a free end with an upward sweep. The ebike further comprises a battery including a pivot configured to engage with the hook.

Figure 1:
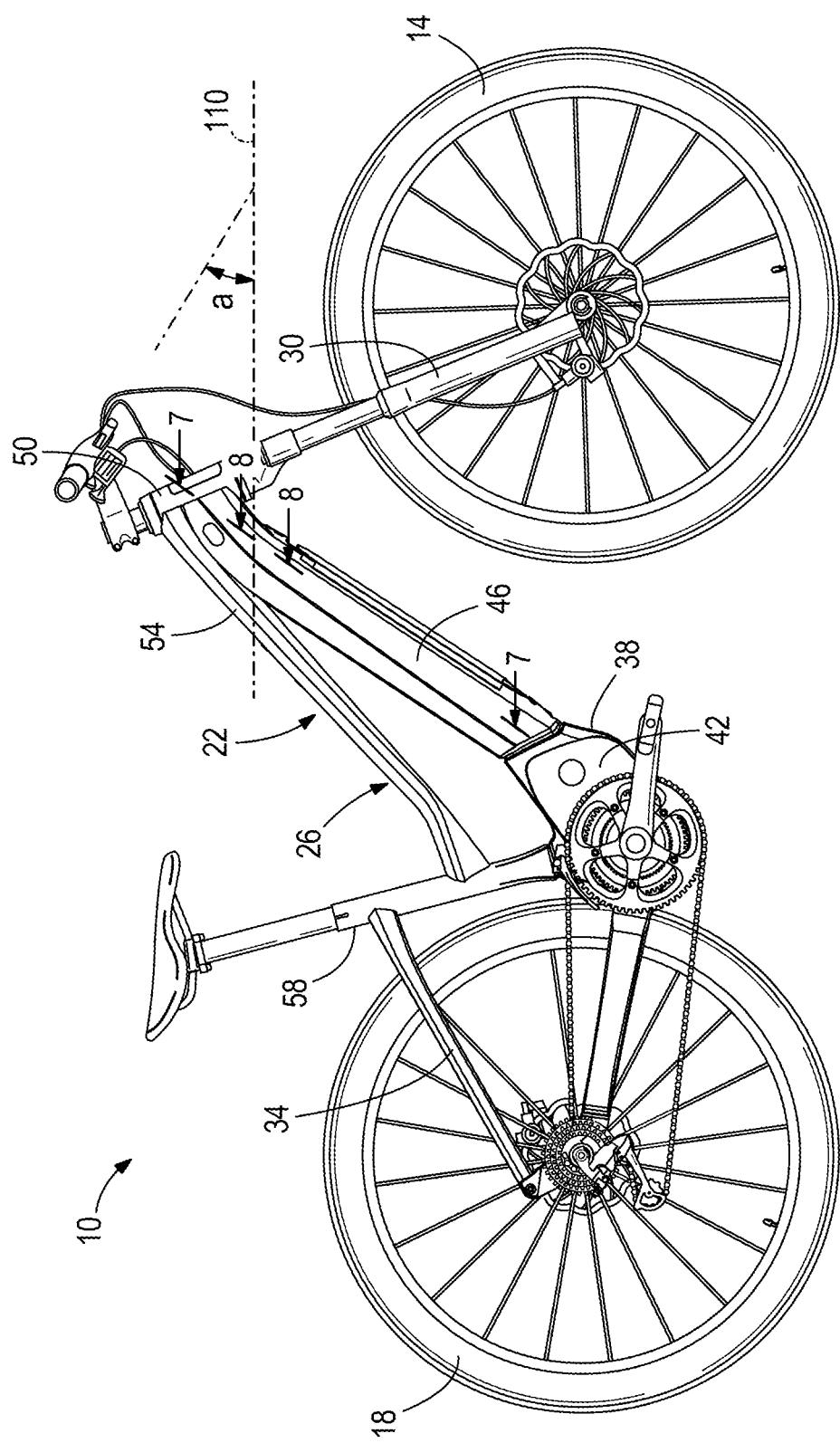
FIG. 1 is a right side view of an ebike according to an embodiment.
Figure 2:
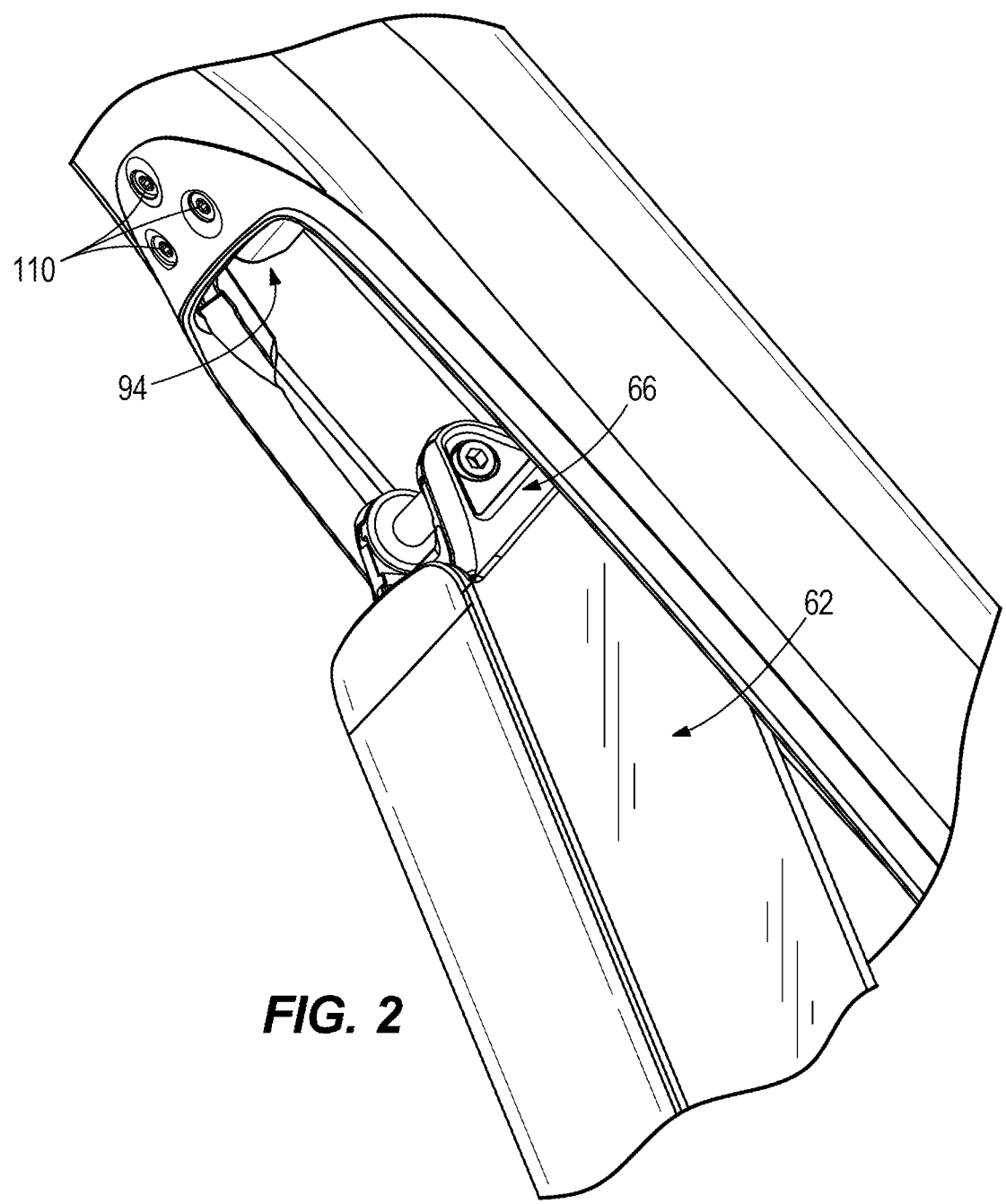
FIG. 2 is a partial perspective view of the ebike of FIG. 1, showing an upper end of a battery being inserted into a down tube of the ebike and onto a hook in the down tube.

Referring now to the illustrated embodiment, FIG. 1 illustrates an ebike 10 having a front wheel 14, a rear wheel 18, and a frame assembly 22 coupled to and supported on the front wheel 14 and the rear wheel 18. The frame assembly 22 may include a main frame 26, a front fork 30 rotationally coupled to and supported on a front part of the main frame 26, and a rear frame 34 coupled (e.g., pivotally coupled) to and supported on a rear part of the main frame 26. The main frame 26 may include a bottom shell 38, a motor assembly 42, and multiple tubes (e.g., hollow tubes), such as, for example, a down tube 46, a head tube 50, a top tube 54, and a seat tube 58. The motor assembly 42 can be disposed at least partially within the bottom shell 38.

With reference to FIGS. 2-10, the ebike 10 additionally includes a battery 62 that is disposed at least partially within the frame assembly 22 (e.g., the down tube 46), and that is electrically coupled to the motor assembly 42 to electrically power the motor assembly 42. In the illustrated embodiment, the battery 62 is disposed entirely, or substantially entirely, within an interior of the down tube 46. In other embodiments, at least part of the battery 62 can be disposed outside of the interior of the down tube 46. The battery 62 may be elongate, and may include a first end 66 (e.g., an upper end) and a second end 70 (e.g., a lower end) spaced apart and opposite from the first end 66 along an axis 74.

Figure 4:
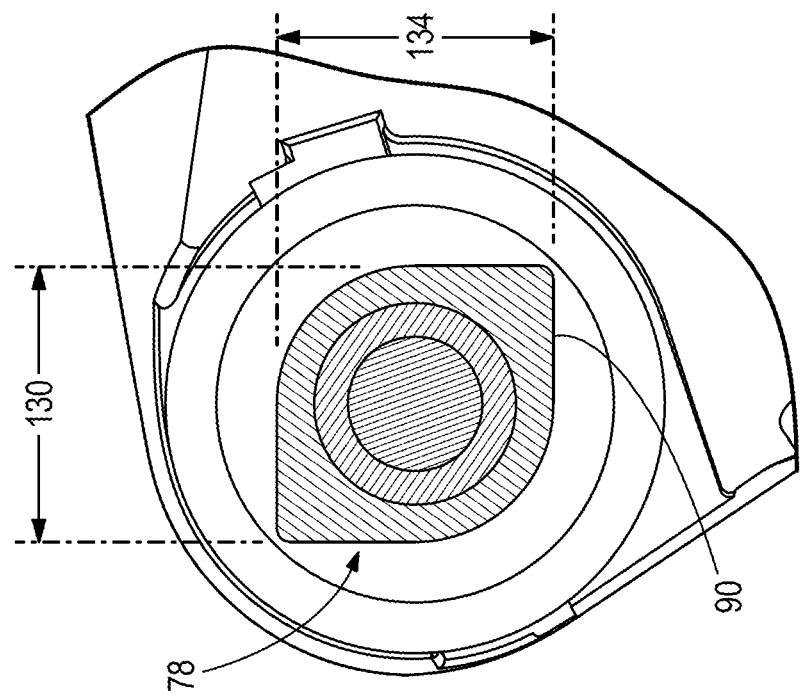
FIG. 4 is a cross-sectional view of the pivot of FIG. 3, taken along lines 4-4 in FIG. 3.
Figure 3:
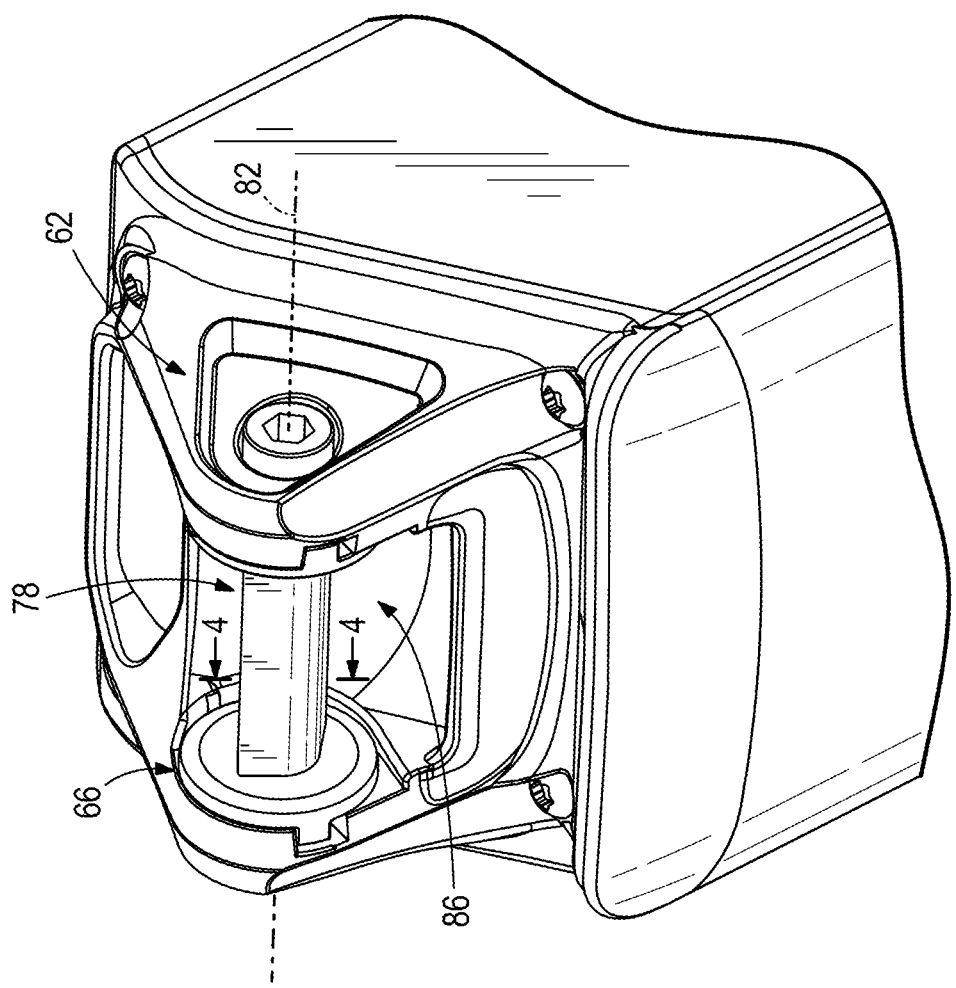
FIG. 3 is perspective view of the upper end of the battery of FIG. 2, showing a pivot of the battery.
Figure 8:
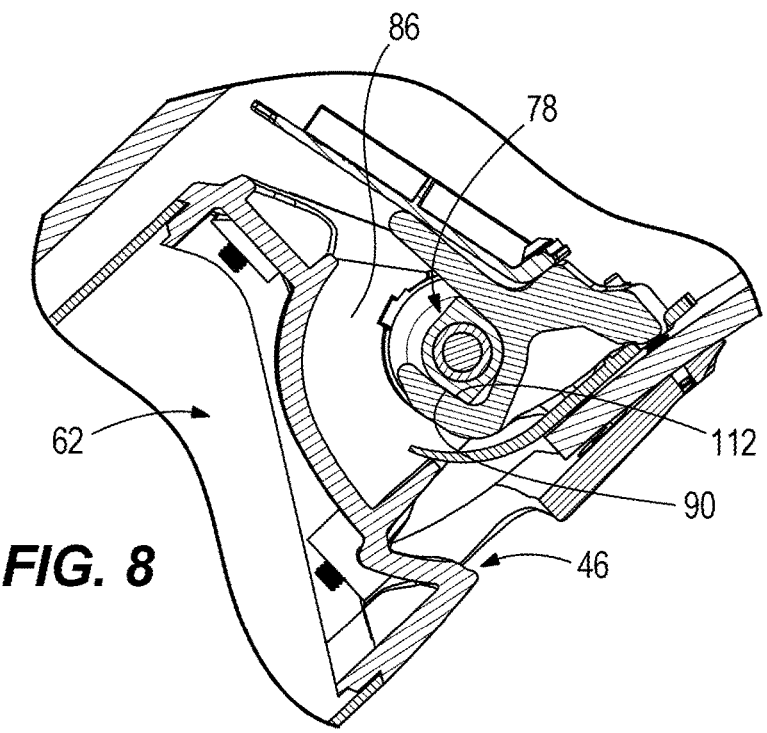

The first end 66 of the battery 62 may include a pivot 78. In the illustrated embodiment, and with reference to FIGS. 3 and 4, the pivot 78 is an elongate pin extending along an axis 82 that is perpendicular to the axis 74. The illustrated pivot 78 may be a fixed structure rigidly attached to a remainder of the battery 62, although in other embodiments, the pivot 78 may rotate relative to the remainder of the battery 62. As illustrated in FIGS. 3 and 8, the pivot 78 is spaced by a gap 86 from the rest of the battery 62. Additionally, and as illustrated in FIG. 4, the pivot 78 has an oblong cross-sectional shape (e.g., eye-shaped, oval-shaped, or other shape) that defines at least one non-cylindrical (e.g., flat or substantially flat) outer surface or region 90 that limits rotation of the pivot 78. Other embodiments may include different cross-sectional shapes than that illustrated.

Figure 6:
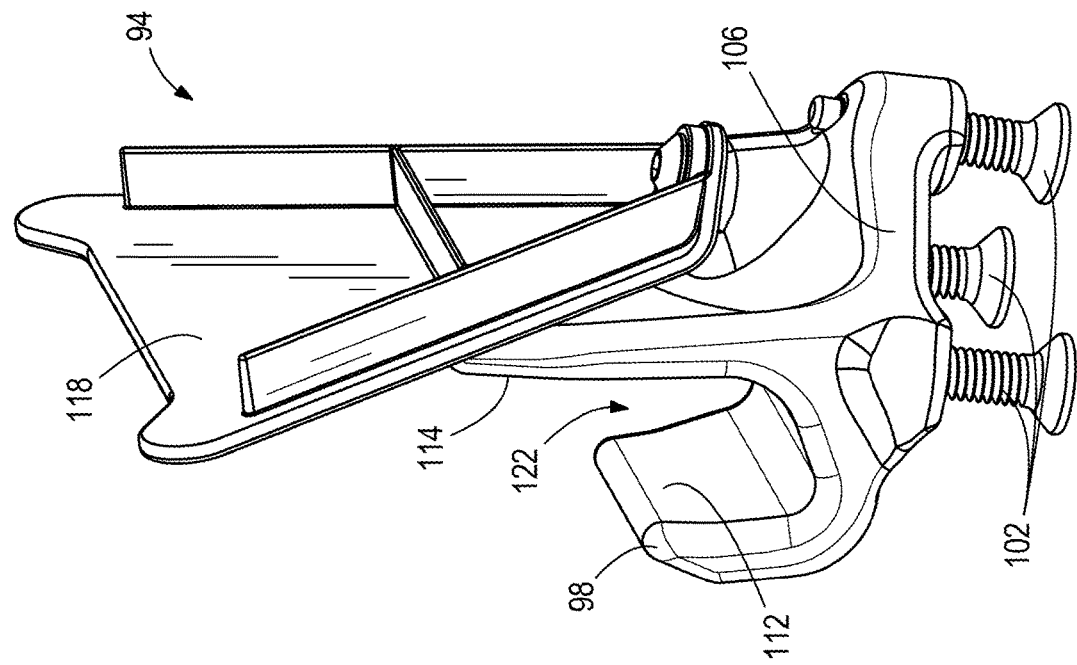
FIGS. 5 and 6 are perspective views of the hook of FIG. 2 apart from the down tube.
Figure 5:
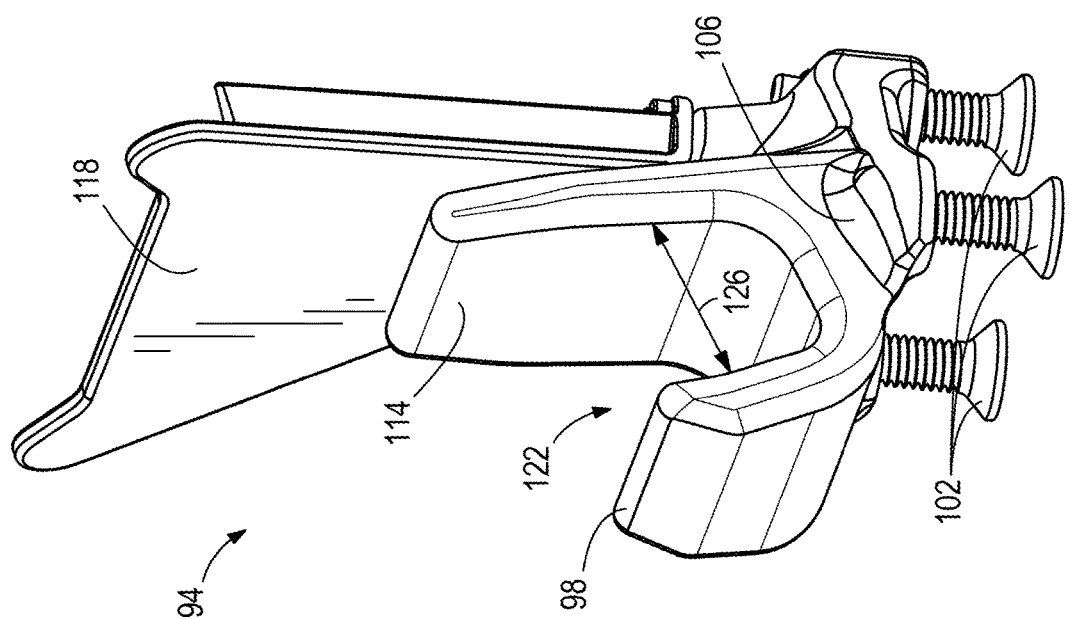
Figure 7:
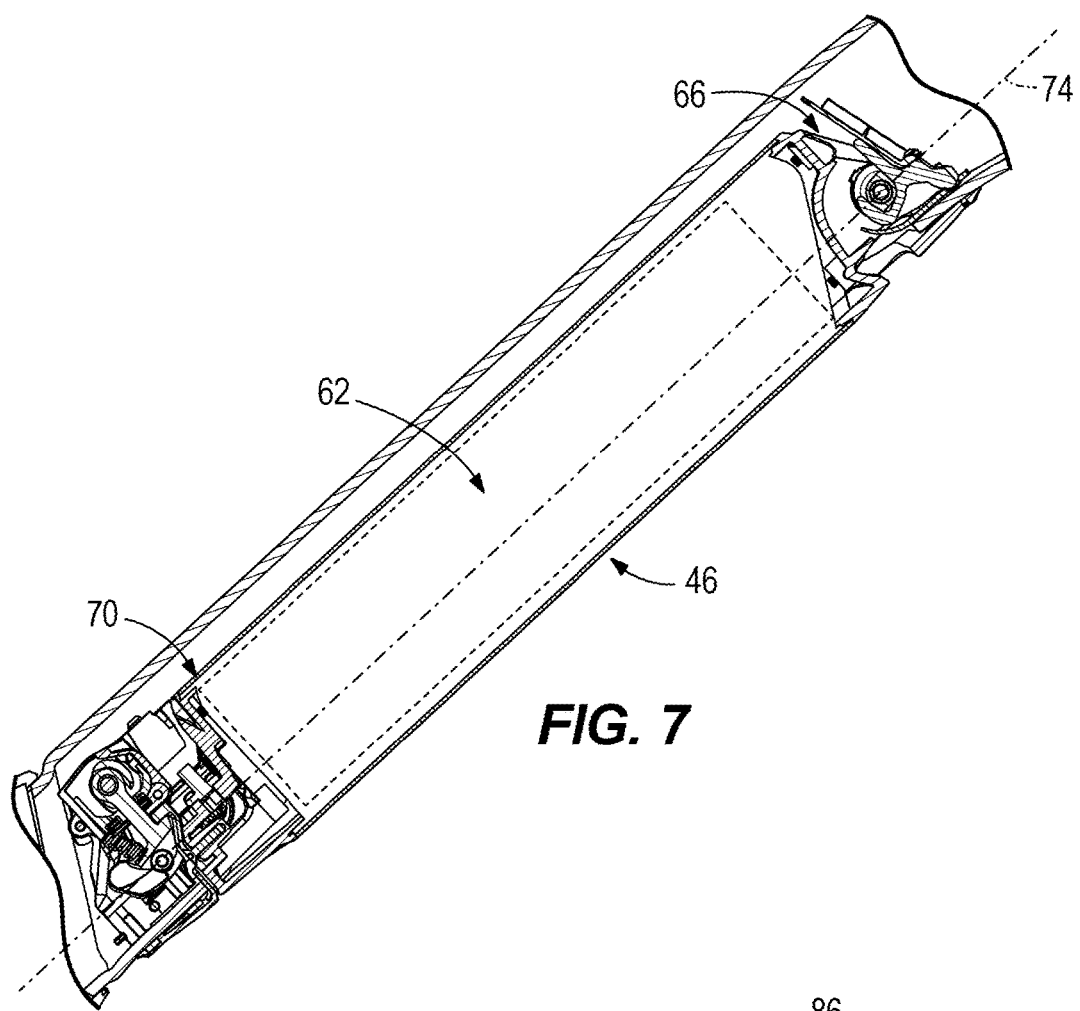
FIGS. 7 and 8 are partial cross-sectional views of the ebike of FIG. 1, taken along lines 7-7 and 8-8 respectively in FIG. 1, showing the battery of FIG. 2 fully inserted into the down tube, the upper end of the battery being hooked on the hook, and a lower end of the battery being latched by a latching assembly.

With continued reference to FIGS. 2-10, the frame assembly 22 may include a hook 94 disposed within the down tube 46, such as, for example, within an upper end of the down tube 46. As illustrated in FIGS. 5 and 6, the hook 94 may include a free end 98 having an upward sweep (e.g., may curve upwardly). In the illustrated embodiment, the hook 94 is fastened to the down tube 46 with fasteners 102. The fasteners 102 extend through the down tube 46 and into a base portion 106 of the hook 94 to securely hold the hook 94 in place. The free end 98 extends upwardly from the base portion 106. In other embodiments, the hook 94 may be integrally formed within the down tube 46, or may be fastened to the down tube 46 with other numbers or arrangements of fasteners, or at locations other than that illustrated.

With reference to FIGS. 1, 5 and 6, in the illustrated embodiment, the free end 98 of the hook 94 sweeps (e.g., curves) away from the base portion 106 of the hook 94. When the hook 94 is secured inside the down tube 46, the upward sweep of the free end 98 is at an angle "a" of at least 45 degrees relative to a horizontal plane 110 (FIG. 1). The horizontal plane 110 is a plane that is parallel to a flat ground surface upon which the front wheel 14 and the rear wheel 18 rest. For example, in the illustrated embodiment the free end 98 includes an inner, planar surface 112. The inner surface 112 extends at an angle of at least 45 degrees relative to the horizontal plane 110. In other embodiments the upward sweep may be at an angle of at least 70 degrees, or at least 80 degrees relative to the horizontal plane 110. In some embodiments, the upward sweep extends no farther than 90 degrees (i.e., vertical) relative to the horizontal plane 110. Other embodiments may include different values and ranges.

With reference to FIGS. 5 and 6, the hook 94 may additionally include a projecting support region 114 disposed opposite the free end 98 (e.g., facing the inner surface 112), and a further guide plate 118 disposed behind the projecting support region 114. The projecting support region 114 extends from the projecting base portion 106. The projecting support region 114 and the free end 98 define a throat 122 (e.g. recess or cavity) therebetween to receive the pivot 78. As illustrated in FIGS. 5 and 6, the guide plate 118 may be a separate component than the base portion 106, the upwardly-sweeping free end 98, and the projecting support region 114, and may be fastened to the base portion 106. In other embodiments the guide plate 118 may be formed integrally with the rest of the hook 94. In some embodiments, the guide plate 118 may be omitted entirely.

With reference to FIGS. 2-10, the pivot 78 of the battery 62 may engage with the hook 94 when the battery 62 is installed within the down tube 46. During installation, the first end 66 of the battery 62 may first be inserted into the down tube 46 until the pivot 78 hits the guide plate 118 and is generally guided down into the throat 122. In this position, the pivot 78 has extended up and over the upwardly-sweeping free end 98 of the hook 94, such that the free end 98 extends into the gap 86 adjacent the pivot 78, and such that the pivot 78 is nested within the throat 122. The battery 62 may then be pivoted about the axis 82 until it is latched in place at the second end 70 of the battery 62. As illustrated in FIG. 5, the throat 122 may include a throat width 126, and as illustrated in FIG. 4, the oblong-shaped pivot 78 may have a maximum width 130 greater than the throat width 126, and a minimum width 134 less than the throat width 126. When the battery 62 is installed, the maximum width 130 of the pivot 78 may limit rotation of the battery 62 relative to the hook 94, such that the battery 62 may only be rotated within a predetermined range (e.g. within 90 degrees, within 60 degrees, within 30 degrees, etc.) about the axis 82. Other embodiments can include different values and/or relationships of widths 126, 130, 134 than that illustrated.

Figure 9:
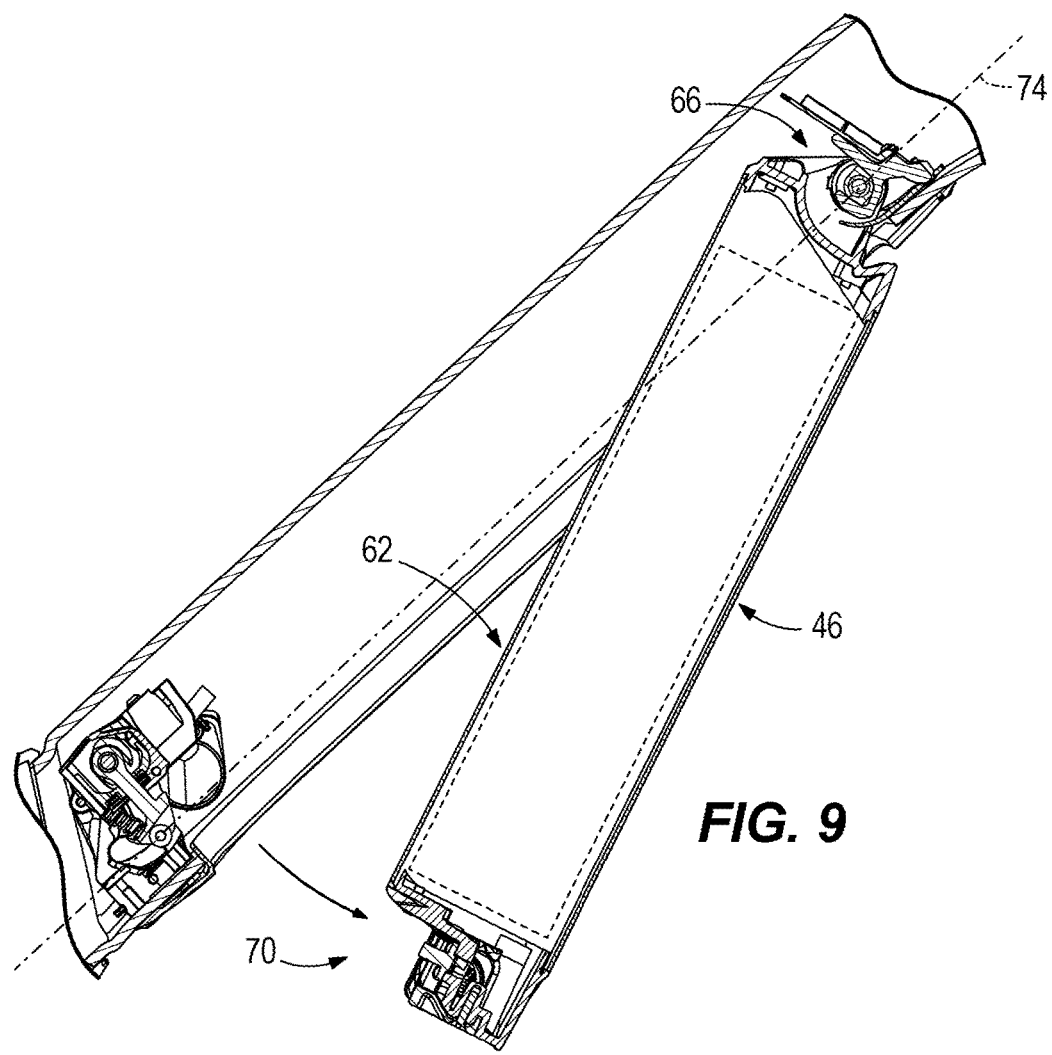
FIGS. 9 and 10 are partial cross-sectional views of the ebike of FIG. 1, again taken along lines 7-7 and 8-8 in FIG. 1, showing the battery of FIG. 2 unlatched from the latching assembly of FIGS. 7 and 8.
Figure 10:
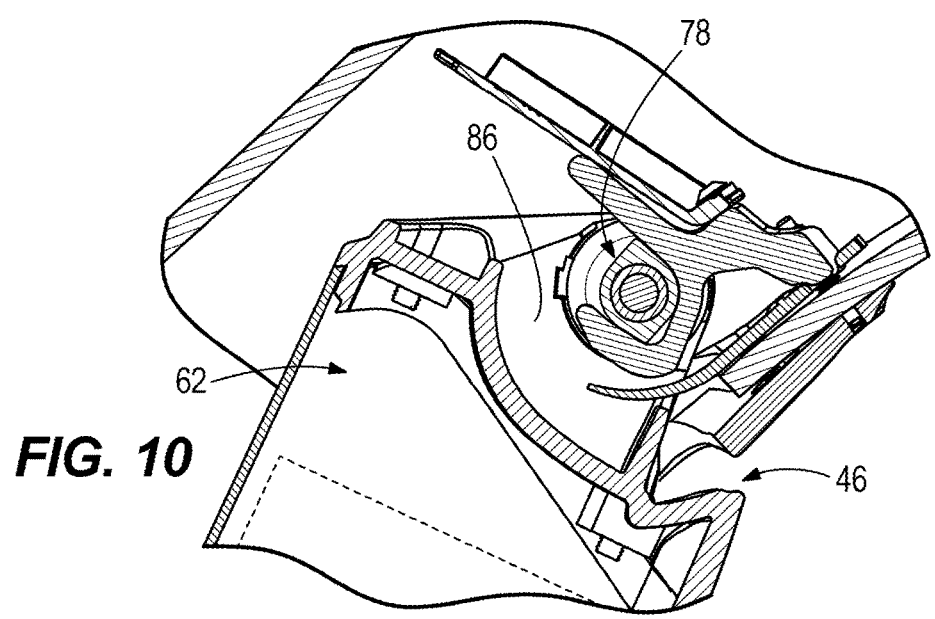

With reference to FIG. 9, when the battery 62 is unlatched, the battery 62 may pivot and hang freely from hook 94, and naturally tends to fall and hang in the position seen in FIG. 9. As described above, the battery 62 is limited in its rotation by the values and/or relationships of widths 126, 130, 134, such that the battery 62 for example does not swing freely and contact/rub against the frame or swing off of the hook 94. Other embodiments may include different positions for the battery 62 when the battery 62 is naturally hanging from the hook 94.

Figure 11:
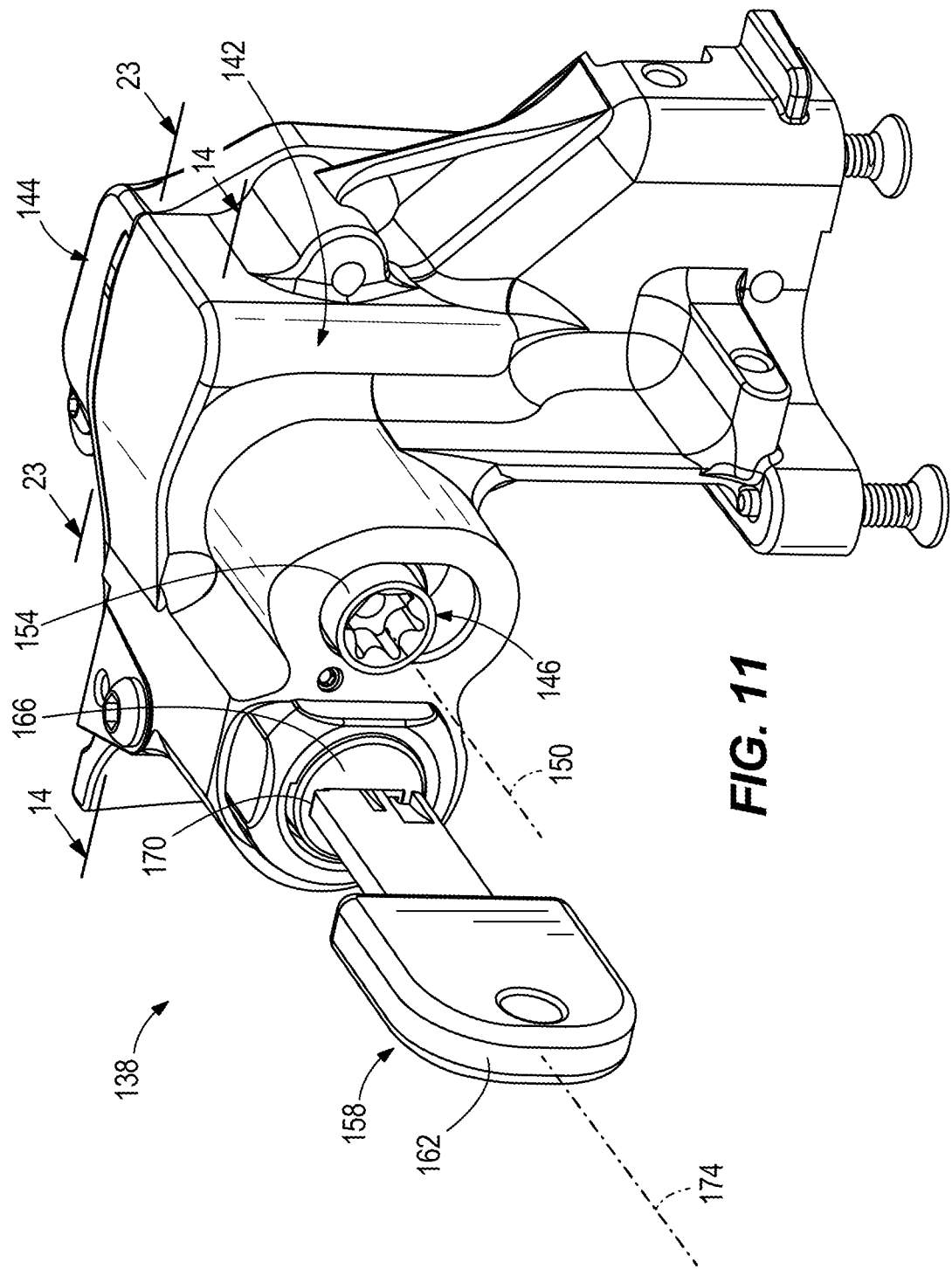
FIG. 11 is a perspective view of the latching assembly of FIGS. 7 and 8 apart from the down tube.

With reference to FIG. 11, the ebike 10 includes a battery latching assembly 138 that secures (e.g., releasably secures) the battery 62 to the frame assembly 22. As illustrated in FIG. 11, the battery latching assembly 138 may include at least one outer housing. In the illustrated embodiment the battery latching assembly 138 includes a first outer housing 142 and a second outer housing 144 coupled (e.g., fastened) to the first outer housing 142. The first outer housing 142 and the second outer housing 144 may define an interior cavity within the battery latching assembly 138. The first outer housing 142 and the second outer housing 144 may also be considered part of the frame assembly 22. The battery latching assembly 138 may be located (e.g., secured in place) at least partially within the down tube 46, such as, for example, at a lower end of the down tube 46. In some of these or in other embodiments, the latching assembly 138 may be located (e.g., secured in place) at least partially within the bottom shell 38. In the illustrated embodiment, the battery latching assembly 138 releasably secures the second end 70 of the battery 62 to the frame assembly 22, whereas the first end 66 of the battery 62 is pivotally coupled to the hook 94 described above.

As explained in further detail below, the battery latching assembly 138 can be operated to place the battery latching assembly 138 in (1) a first state (e.g., a secured state) in which the second end 70 of the battery is fully secured or mounted, (2) a second state (e.g., an open state) in which the second end 70 of the battery is partially secured or mounted, and (3) a third state (e.g., a released state) in which the second end 70 of the battery 62 is unsecured or released.

Figure 12:
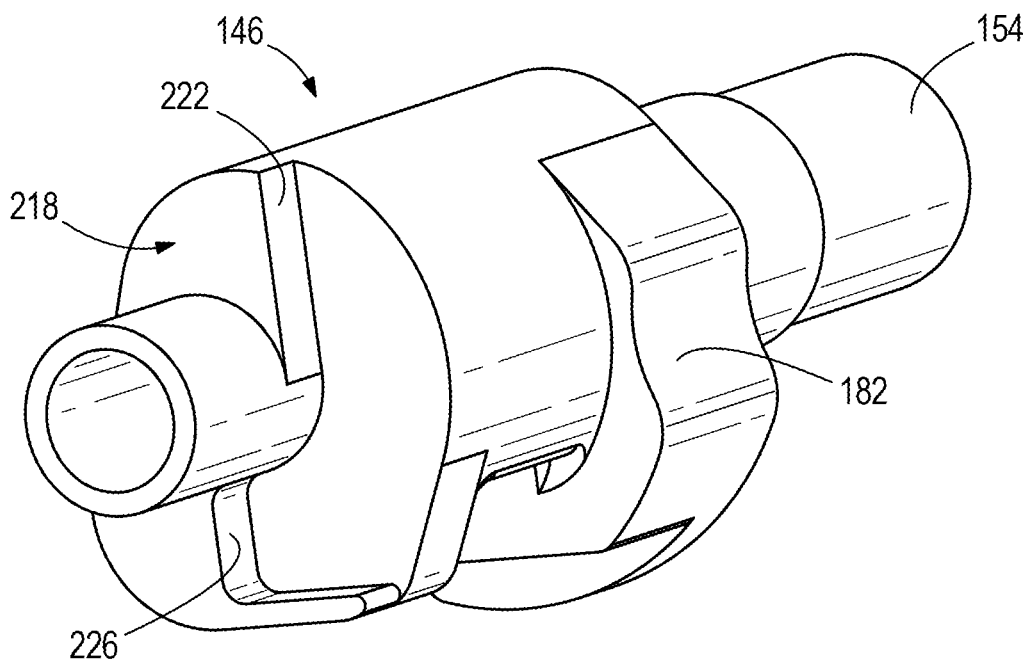
FIGS. 12 and 13 are perspective views of a release member of the latching assembly of FIGS. 7 and 8 apart from the latching assembly.
Figure 13:
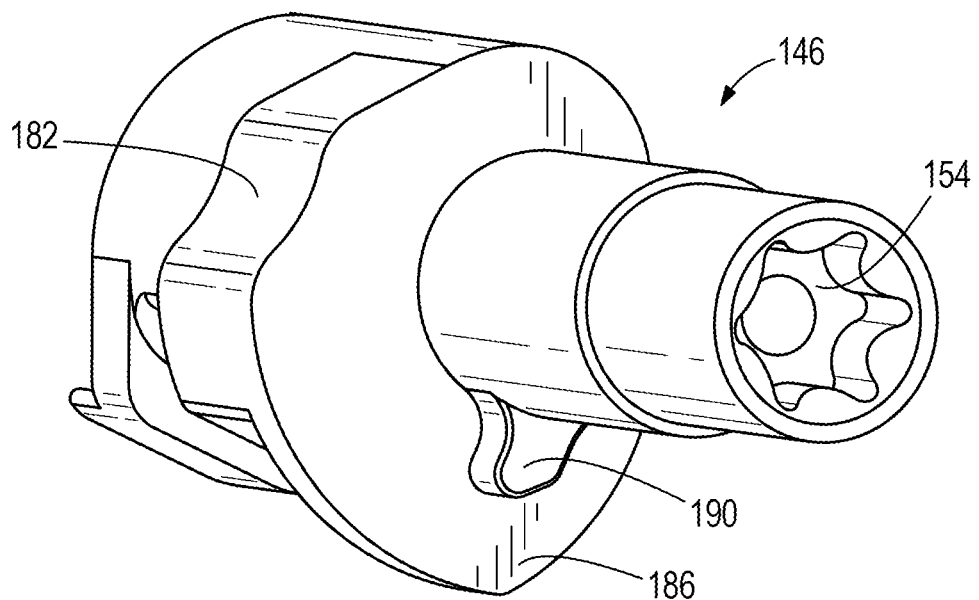

With reference to FIGS. 11-13, the battery latching assembly 138 includes a release member 146. The release member 146 may be a rotating cam structure that rotates about an axis 150 and includes a tool engagement end 154. The tool engagement end 154 is sized and shaped to receive a tool (e.g., lever) that may be used to rotate the release member 146 about the axis 150. In the illustrated embodiment the tool engagement end 154 defines a star-shaped recess sized and shaped to receive a correspondingly star-shaped end of a lever. Other embodiments may include various other types of tool engagement ends 154 (e.g., tool engagement ends 154 with other shaped recesses, protrusions, or other features that facilitate engagement with a tool). As illustrated in FIG. 11, at least a portion (e.g., most) of the release member 146 may be disposed and concealed within the interior cavity defined by the first outer housing 142 and the second outer housing 144, whereas the tool engagement end 154 may be exposed to and/or located in an environment outside of the first outer housing 142 and the second outer housing 144.

With reference to FIG. 11, the battery latching assembly 138 also includes a locking subassembly 158 for locking a rotational movement of the release member 146 about the axis 150. The locking subassembly 158 includes a key 162 and a rotating key member 166 (e.g., cylinder) disposed within a portion of the first outer housing 142. The key 162 is sized and shaped to slide into a corresponding opening 170 in the rotating key member 166, such that when the key 162 is turned the rotating key member 166 rotates about an axis 174 that is parallel to the axis 150. In many embodiments, the key can be removable from the opening 170, but in other embodiments, the key can be permanently fixed in the opening 170.

Figure 14:
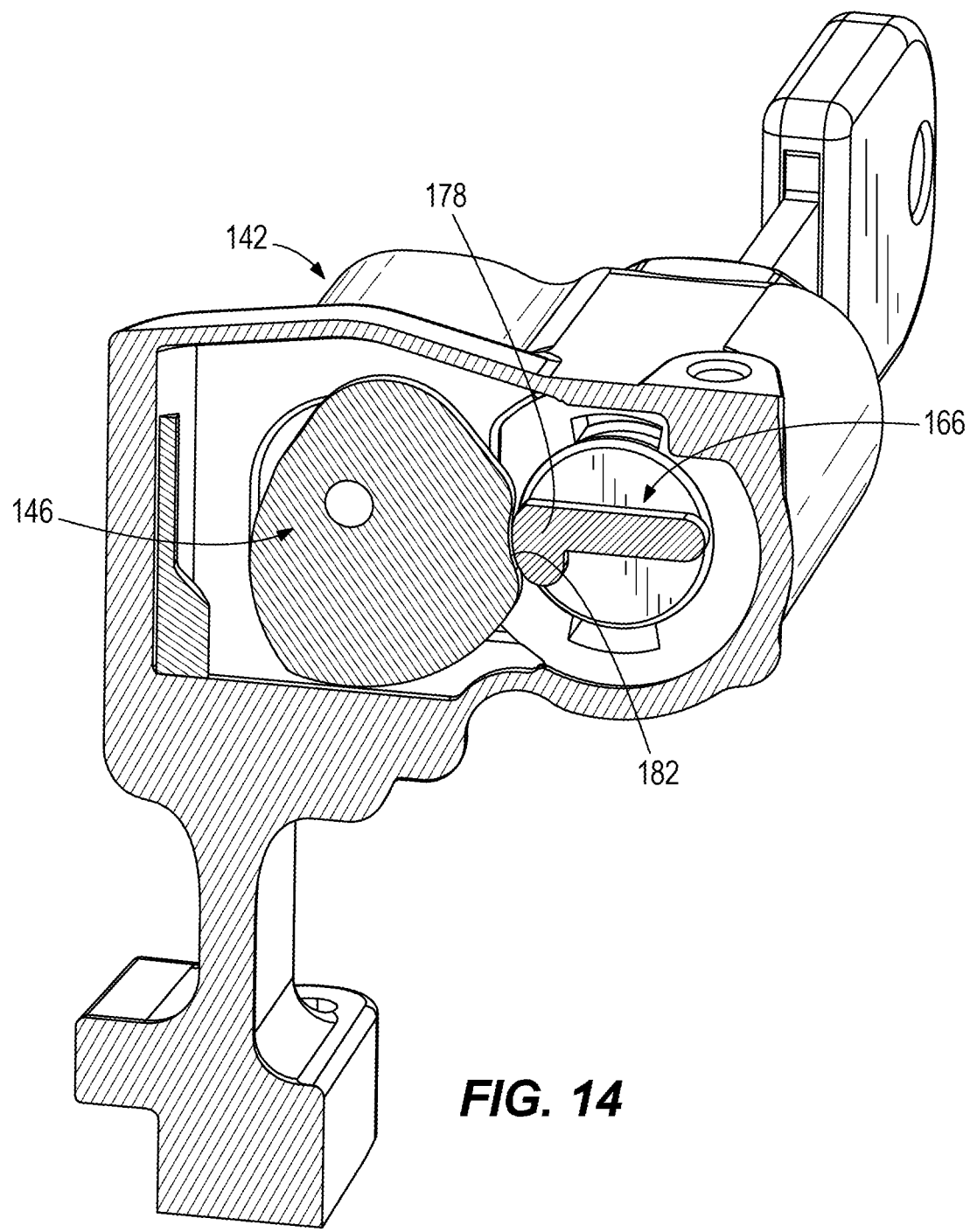
FIG. 14 is a cross-sectional view of the latching assembly of FIGS. 7 and 8, taken along lines 14-14 in FIG. 11, in a secured state, showing a rotating key member preventing the release member of FIGS. 12 and 13 from rotating.
Figure 15:
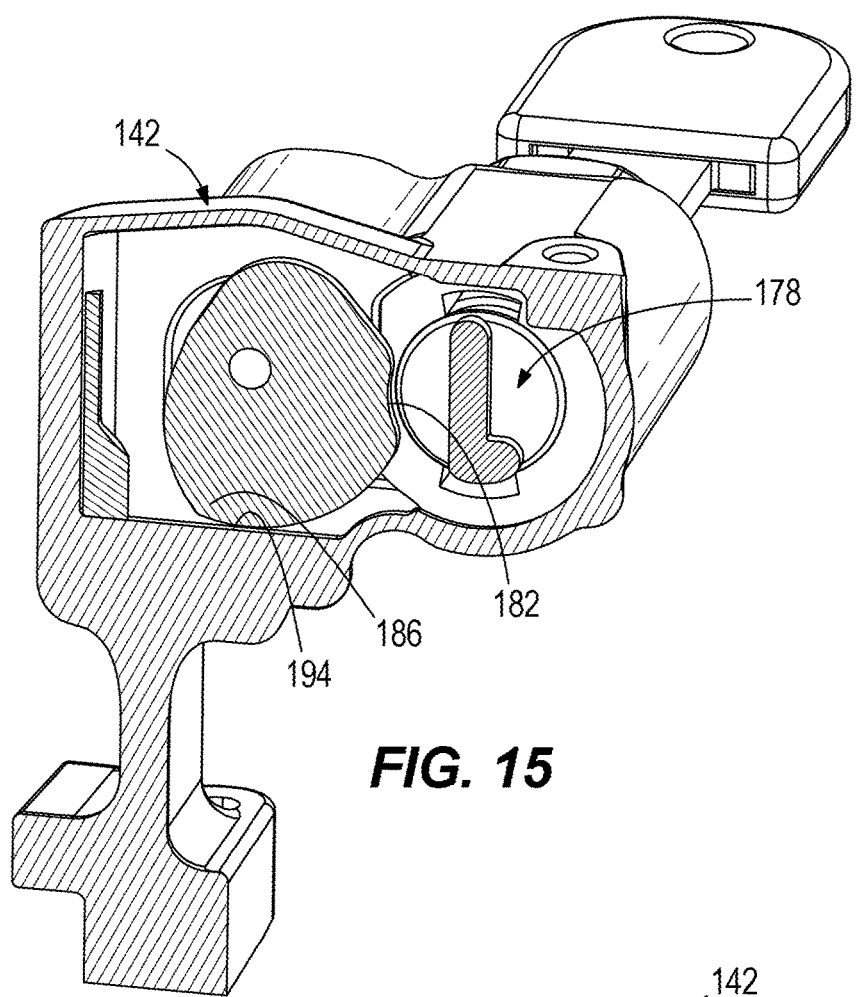
FIGS. 15 and 16 are cross-sectional views of the latching assembly of FIGS. 7 and 8, again taken along lines 14-14 in FIG. 11, in the secured state, showing the rotating key member of FIG. 14 having been rotated to allow the release member to rotate.

With reference to FIGS. 14 and 15, the rotating key member 166 includes a protrusion 178 at distal end of the rotating key member 166. In other embodiments the protrusion 178 may be located elsewhere along the rotating key member 166. With reference to FIGS. 12-15, the release member 146 includes a corresponding recess 182 (e.g., indentation) that is sized and shaped to receive the protrusion 178. As illustrated in FIG. 14, when the protrusion 178 is disposed within the recess 182, the release member 146 is rotationally locked in place, and cannot rotate about the axis 150. In contrast, and with reference to FIG. 15, when the key 162 is turned (e.g., 90 or 180 degrees) the rotating key member 166 rotates, causing the protrusion 178 to move out of the recess 182, thereby unlocking the release member 146. When unlocked, the release member may rotate about its axis 150. In other embodiments the rotating key member 166 may instead include a recess, and the release member 146 may include a corresponding protrusion that is sized and shaped to move into (e.g., slide into) the recess.

With reference to FIGS. 12-31, and as described in further detail below, when the release member 146 is unlocked, the release member 146 may be rotated (e.g., via the lever or other tool inserted into the tool engagement end 154) among (1) a first position (e.g., a secured position) in which the second end 70 of the battery is fully secured or mounted, (2) a second position (e.g., an open position) in which the second end 70 of the battery is partially secured or mounted, and (3) a third position (e.g., a released position) in which the second end 70 of the battery 62 is unsecured or released. In many embodiments, positioning the release member 146 in the first position can cause the battery latching assembly 138 to be placed in its first state, positioning the release member 146 in the second position can cause the battery latching assembly 138 to be placed in the second state, and positioning the release member 146 in the third position can cause the battery latching assembly 138 to be placed in the third state.

Figure 16:
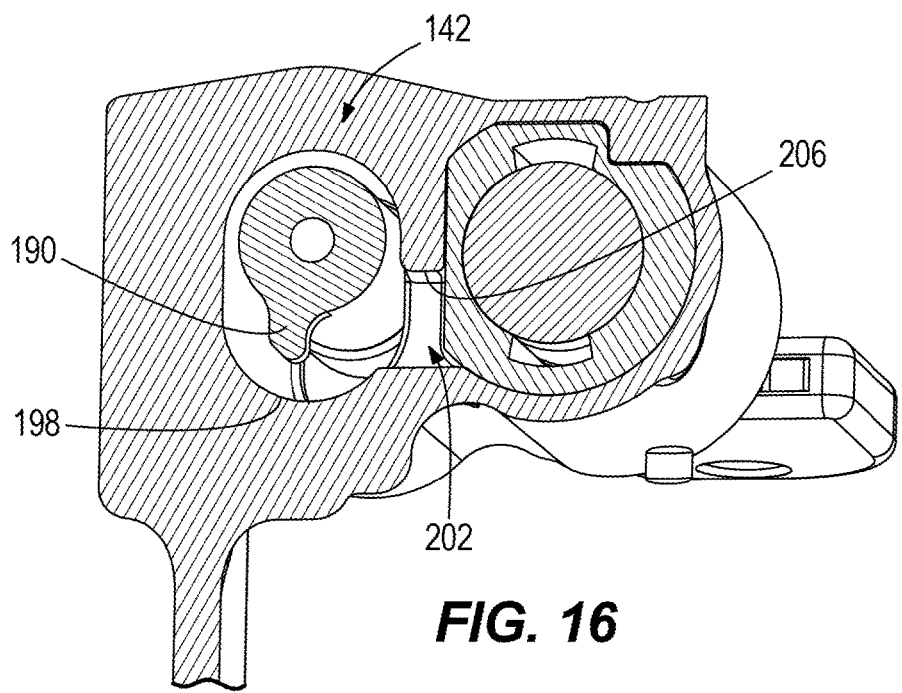
Figure 17:
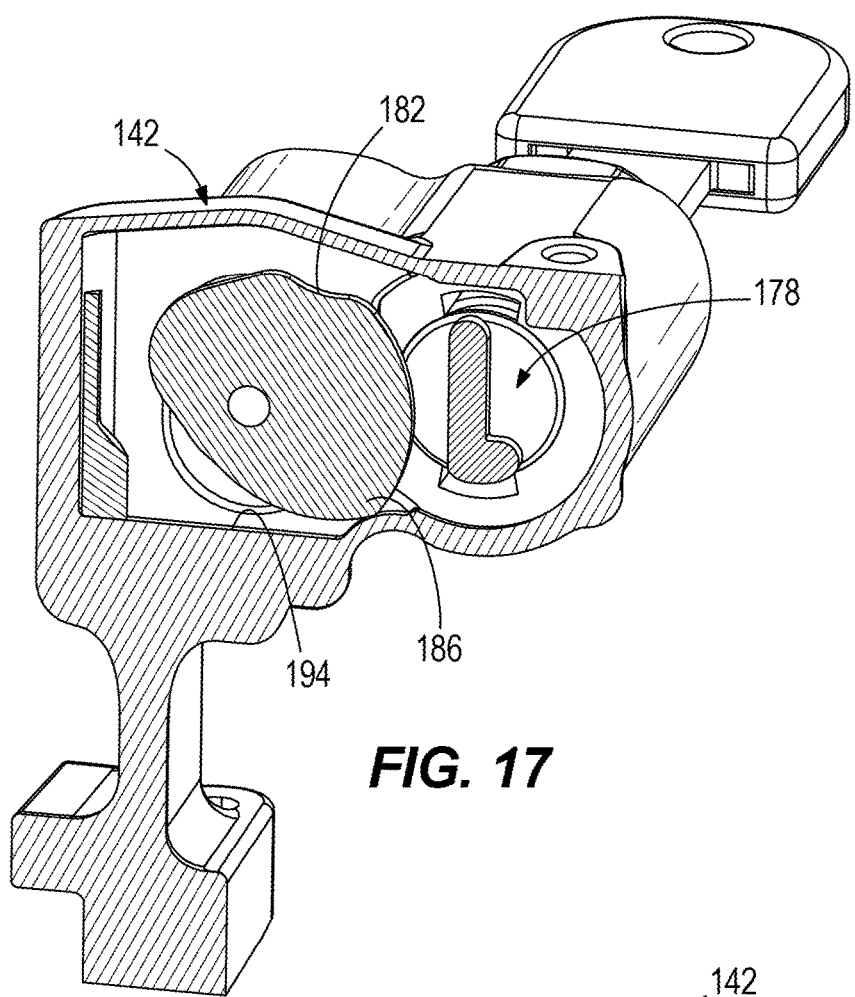
FIGS. 17 and 18 are cross-sectional views of the latching assembly of FIGS. 7 and 8, again taken along lines 14-14 in FIG. 11, in an open state.

With reference to FIGS. 13-20, in the illustrated embodiment the release member 146 includes a first cam member 186 and a second cam member 190. As illustrated in FIGS. 15 and 16, when the release member 146 is in the first position (e.g., secured position), the first cam member 186 may rest on an interior ledge 194 of the first outer housing 142, and the second cam member 190 may point vertically down. In the illustrated embodiment the first cam member 186 is a generally tear-shaped region of the release member 146, and the second cam member 190 is an axial protrusion along the release member 146. Other embodiments include different shapes and sizes of cam members than that illustrated.

Figure 18:
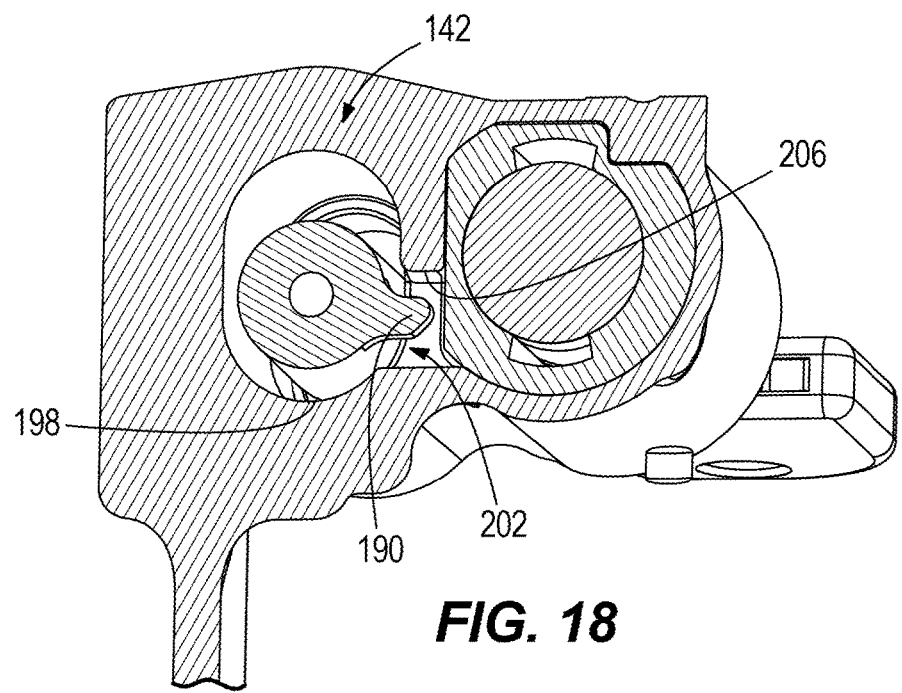
Figure 19:
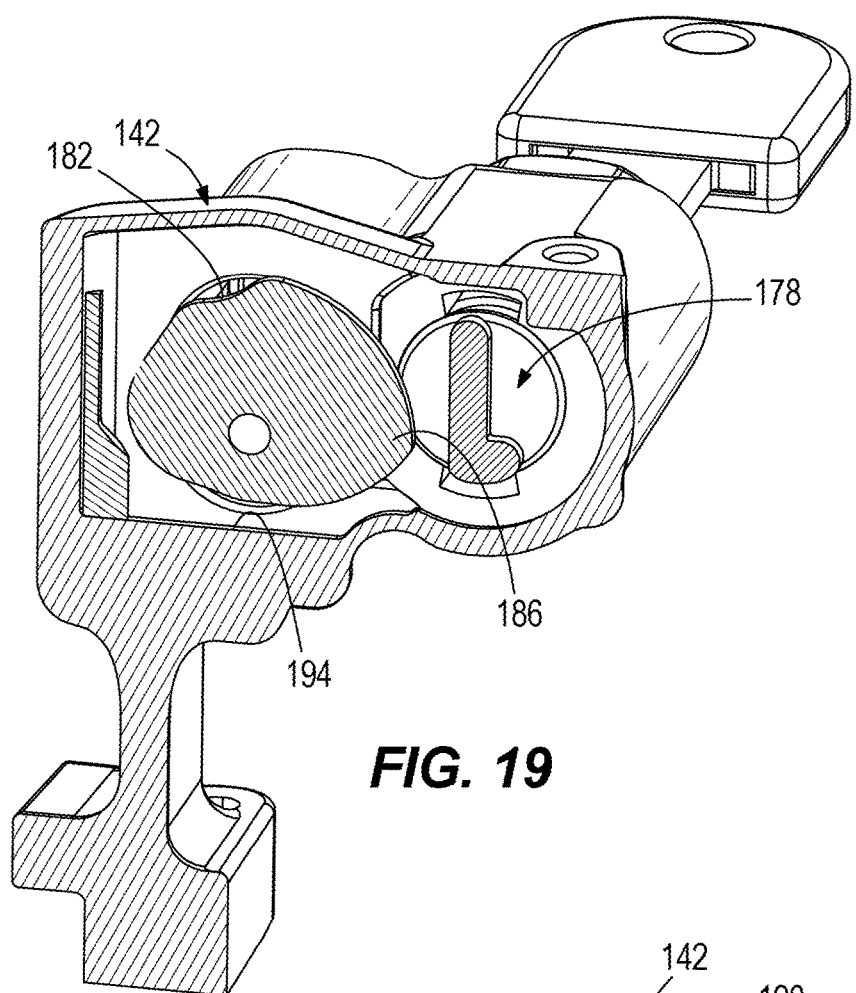
FIGS. 19 and 20 are cross-sectional views of the latching assembly of FIGS. 7 and 8, again taken along lines 14-14 in FIG. 11, in a released state.
Figure 20:
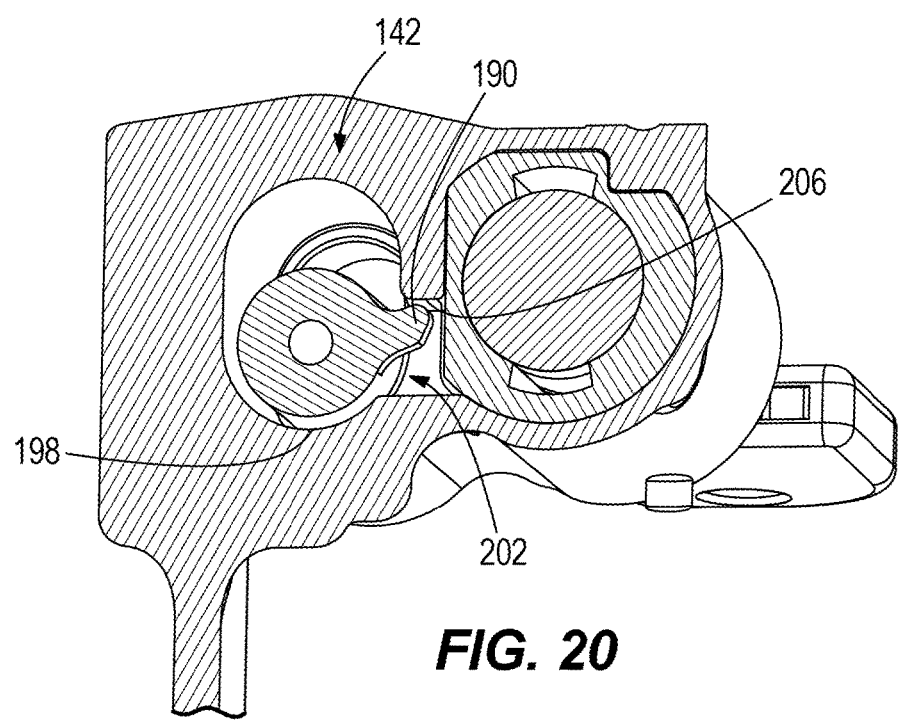

As illustrated in FIG. 16, a portion of the release member 146 may be positioned near an upper end of an oblong-shaped aperture 198 of the first outer housing 142 in the first position (e.g., secured position). Once the release member 146 has been unlocked, the release member 146 may then be rotated in a first rotational direction (e.g., via the lever) from the first position (FIGS. 15 and 16) to the second position (FIGS. 17 and 18) (e.g., open position). In the illustrated embodiment, the release member 146 is rotated approximately 90 degrees about the axis 150 from the first position to the second position in a counterclockwise direction as viewed in FIGS. 15-18. Other embodiments may include different degrees of rotation (e.g., 70 degrees, 85 degrees, 95 degrees, 100 degrees, etc.) or rotate in a clockwise direction. In the illustrated embodiment, when the release member 146 is rotated, the first cam member 186 initially presses against the interior ledge 194, slightly raising the release member 146 within the oblong-shaped aperture 198. As the release member 146 is rotated further, the shape of the first cam member 186 causes the release member 146 to lower down within the oblong-shaped aperture 198, to the second position seen in FIGS. 17 and 18. During rotation of the release member 146, the second cam member 190 may move into (e.g., snaps into) a recessed region 202 (e.g., cutout, notch, etc.) of the first outer housing 142. As illustrated in FIG. 18, once in the second position the release member 146 has moved down within the oblong-shaped aperture 198, and the second cam member 190 has rotated 90 degrees counterclockwise (i.e., pointing to the right in FIG. 18).

The release member 146 may be rotated yet further about the axis 150 from the second position (FIGS. 17 and 18) (e.g., open position) to the third position (FIGS. 19 and 20) (e.g., released position), again in a counterclockwise direction as viewed in FIGS. 17-20. In the illustrated embodiment, the release member 146 is rotated approximately 20 degrees about the axis 150 from the second position to the third position. Other embodiments may include different degrees of rotation (e.g., 5 degrees, 10 degrees, 15 degrees, 25 degrees, 30 degrees, 35 degrees, etc.) or rotate in a clockwise direction. In the illustrated embodiment, when the release member 146 is rotated to the third position the shape of the first cam member 186 allows the release member 146 to drop farther down within the oblong-shaped aperture 198.

Additionally, the second cam member 190 rotates up and contacts an interior ledge 206 (e.g. an upper ledge) partly defining the recessed region 202 in the first outer housing 142. This contact with the upper, interior ledge 206 presses and forces the release member 146 down to the bottom of the oblong-shaped aperture 198.

Figure 22:
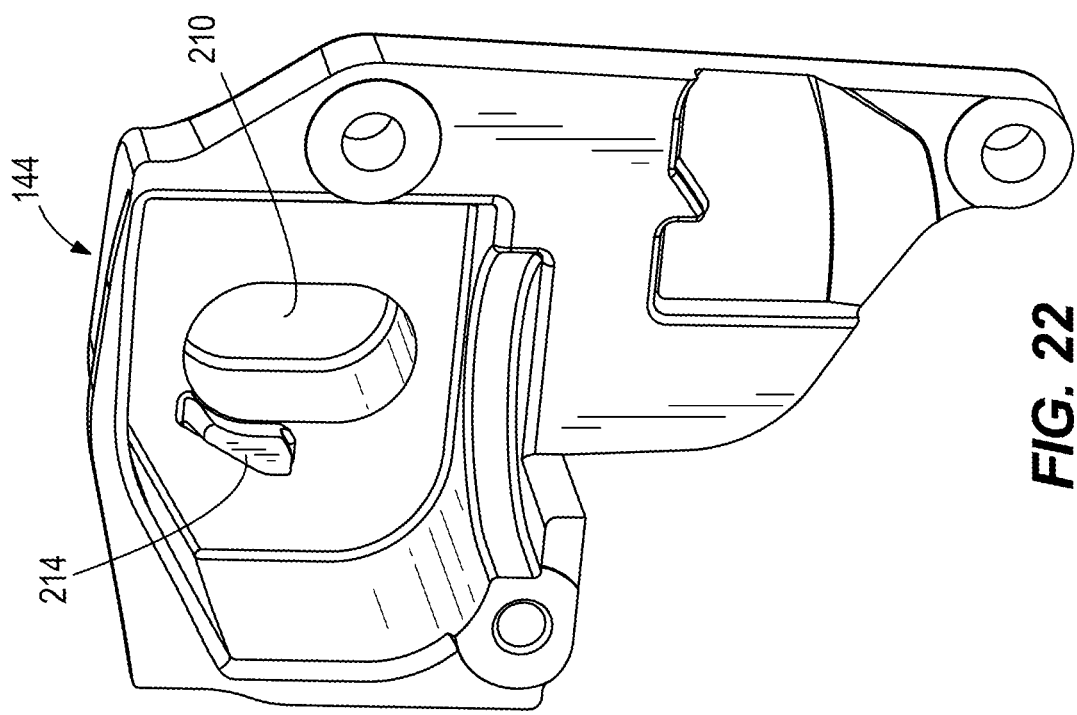
FIG. 22 is a perspective view of a second outer housing of the latching assembly of FIGS. 7 and 8, showing a protrusion on the second outer housing.
Figure 21:
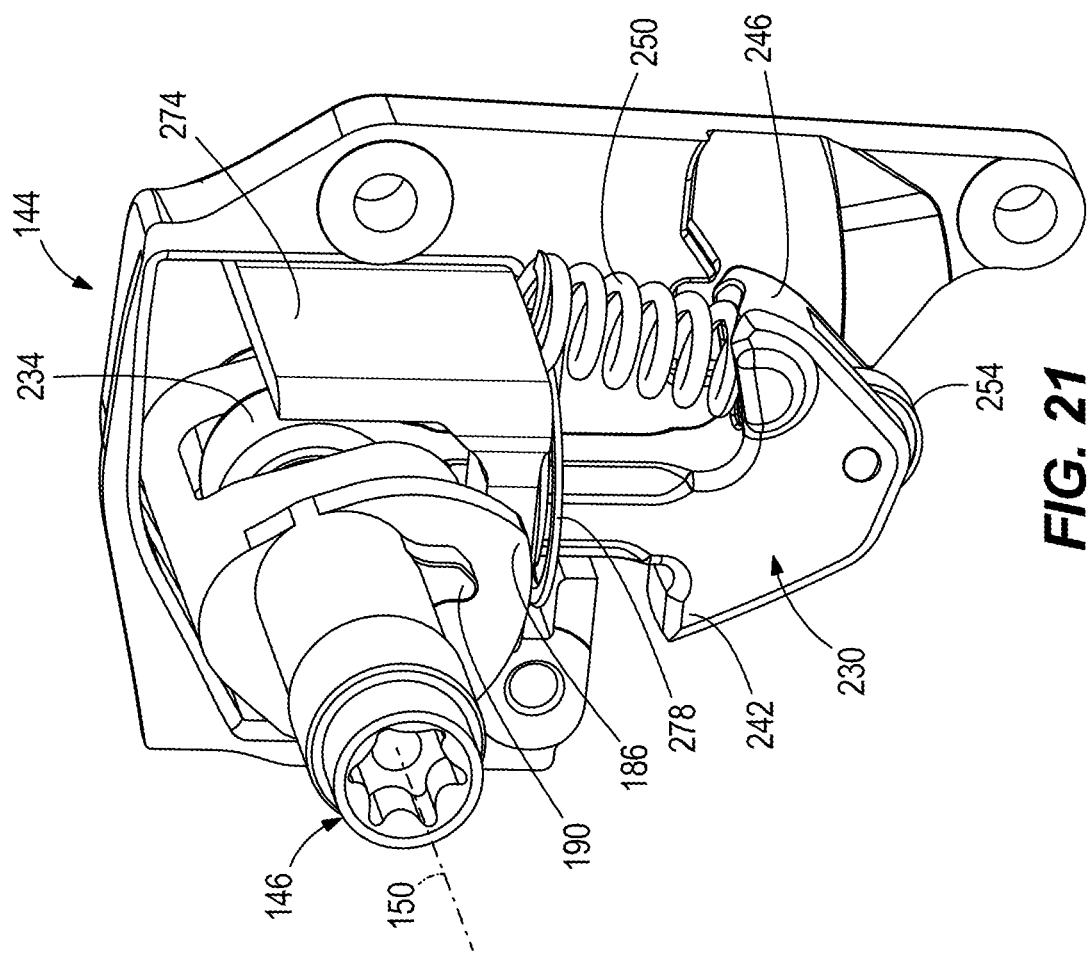
FIG. 21 is a partial, perspective view of the latching assembly of FIGS. 7 and 8, with a front housing portion of the latching assembly removed.

With reference to FIGS. 12 and 21-25, the release member 146 may include at least one additional cam member that further assists in forcing the release member 146 down to the bottom of the oblong-shaped aperture 198 in the third position. In the illustrated embodiment, for example, and with reference FIGS. 21 and 22, a portion of the release member 146 sits at least partially within a second oblong-shaped aperture 210 in the second outer housing 144. The second oblong-shaped aperture 210 is the same size and shape as the oblong-shaped aperture 198 described above, and is aligned with the oblong-shaped aperture 198 when the first outer housing 142 and the second outer housing 144 are secured together. As illustrated in FIG. 22, the second outer housing 144 includes a protrusion 214 located adjacent the second oblong-shaped aperture 210, and as illustrated in FIGS. 12 and 23-25, the release member 146 includes a third cam member 218 having a first surface 222 and a second surface 226. The third cam member 218 can be an axial protrusion extending in a direction opposite of the second cam member 190.

Figure 23:
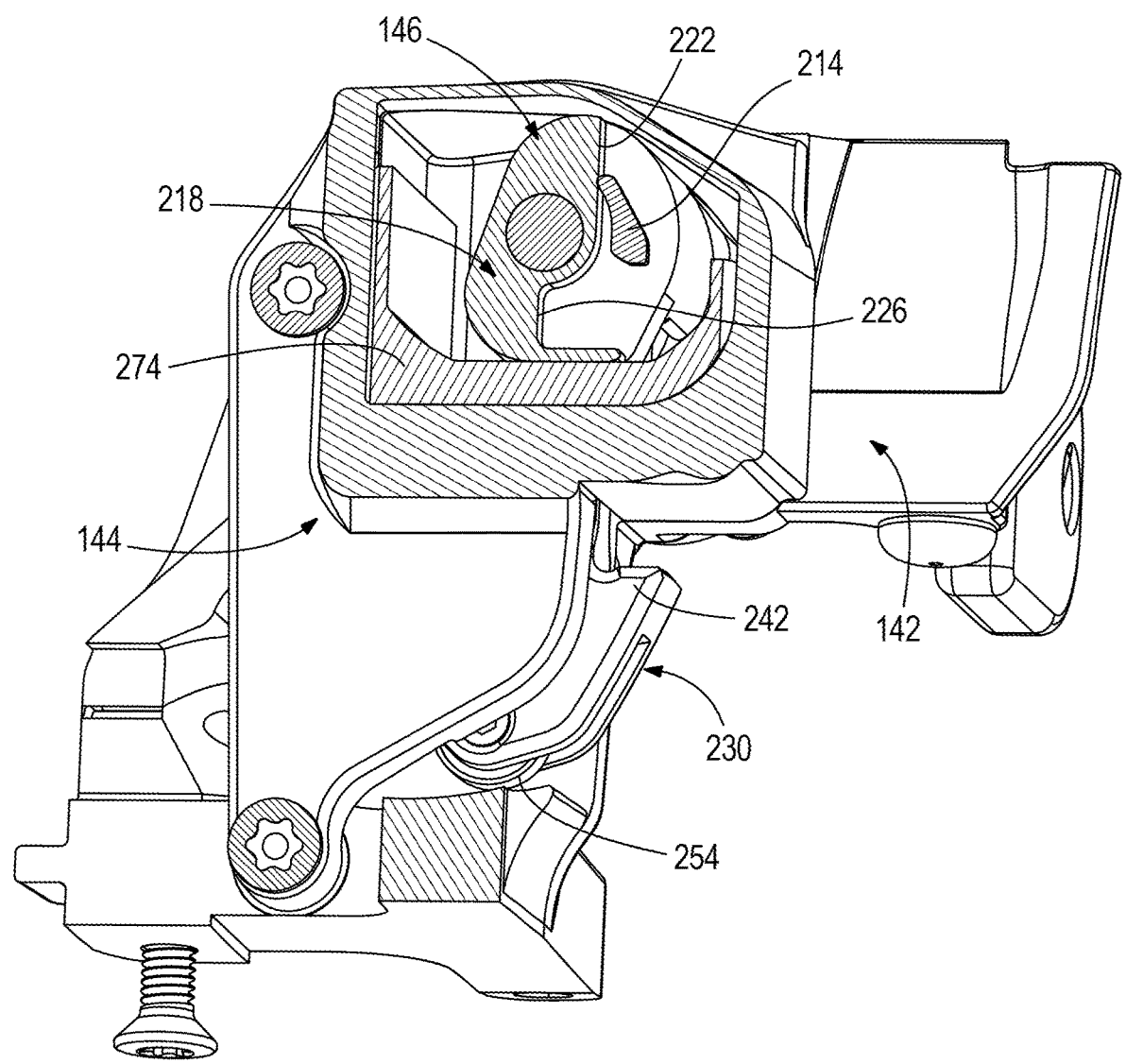
FIG. 23 is a cross-sectional view of the latching assembly of FIGS. 7 and 8, taken along lines 23-23 in FIG. 11, in the secured state of FIG. 14 showing the release member of FIGS. 12 and 13 being limited rotationally via the protrusion of FIG. 22.
Figure 24:
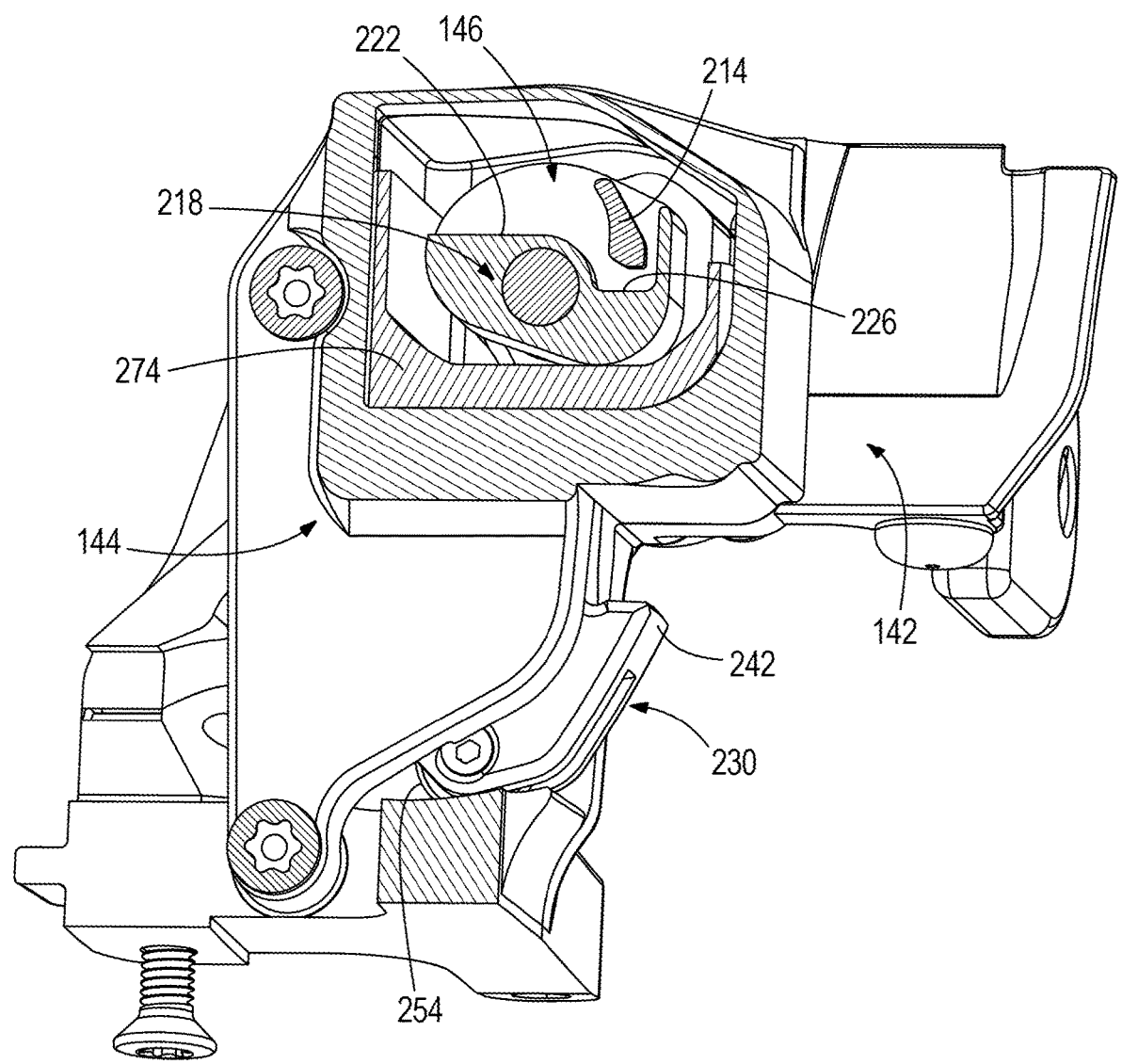
FIG. 24 is a cross-sectional view of the latching assembly of FIGS. 7 and 8, again taken along lines 23-23 in FIG. 11, showing the release member of FIGS. 12 and 13 when the latching assembly is in the open state of FIGS. 17 and 18.
Figure 25:
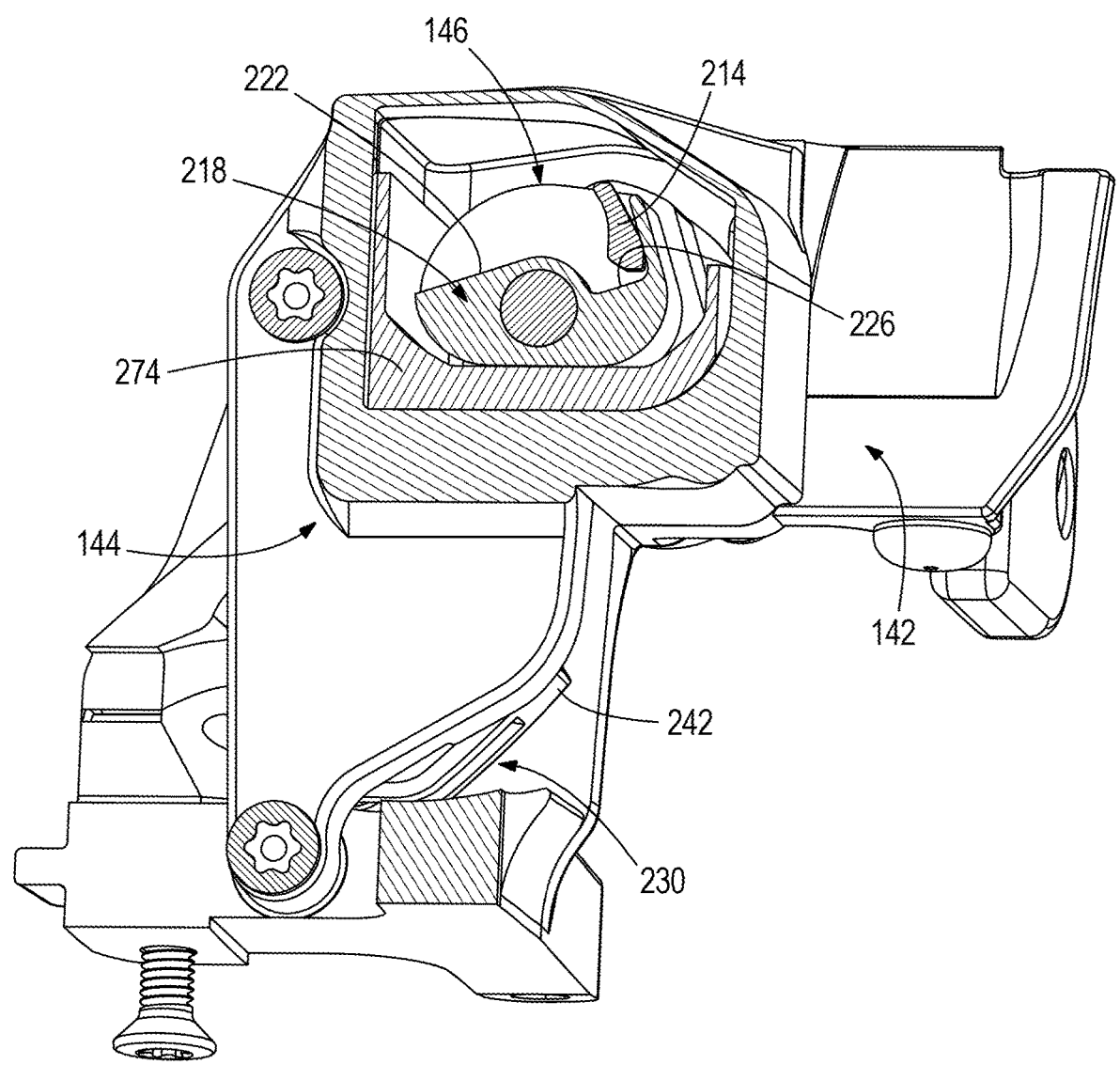
FIG. 25 is a cross-sectional view of the latching assembly of FIGS. 7 and 8, again taken along lines 23-23 in FIG. 11, showing the release member of FIGS. 12 and 13 when the latching assembly is in the released state of FIGS. 19 and 20.

With reference to FIG. 23, when the release member 146 is in the first position (e.g., secured position), the first surface 222 is in contact with the protrusion 214 on the second outer housing 144, thereby acting as a stop surface to prevent the release member 146 from rotating in one direction. In the first position the second surface 226 of the third cam member 218 is spaced well away from the protrusion 214. With reference to FIG. 24, when the release member 146 is rotated (e.g., 90 degrees as described above) from the first position to the second position (e.g., open position), the first surface 222 rotates away from the protrusion 214, and the second surface 226 rotates toward the protrusion 214. With reference to FIG. 25, when the release member 146 is rotated further (e.g., 20 degrees) from the second position to the third position (e.g., released position), the first surface 222 again rotates farther away from the protrusion 214, but the second surface 226 rotates up and contacts a bottom of the protrusion 214. This contact with protrusion 214 presses and forces the release member 146 down to the bottom of the second oblong-shaped aperture 210. In the illustrated embodiment, the second cam member 190 and the third cam member 218 work in conjunction (e.g., simultaneously) to contact the interior ledge 206 and the protrusion 214, respectively, and press the release member 146 down vertically. By working together, the third cam member 218 can balance or offset rotational forces generated by the second cam member 190 engaging the interior ledge 206 and the second cam member 190 can balance or offset rotational forces generated by the third cam member 218 engaging the protrusion 214 to cause the release member 146 to rotate more smoothly about the axis 150. Other embodiments may include different numbers and arrangements of cam members on the release member 146 that contact a surface or surfaces on the first outer housing 142 and/or the second outer housing 144 to cause the release member 146 to be pressed vertically downwards in the third position. Additionally, other embodiments may include other surfaces than that illustrates that act as stop surfaces to prevent or inhibit rotational motion of the release member 146 in one direction.

With reference to FIGS. 21 and 23-31, the battery latching assembly 138 may include a latch member 230 that is coupled to the release member 146. As described in further detail below, the latch member 230 may be positioned in (1) a first position (e.g., a secured position) in which the second end 70 of the battery is fully secured or mounted, (2) a second position (e.g., an open position) in which the second end 70 of the battery is partially secured or mounted, and (3) a third position (e.g., a released position) in which the second end 70 of the battery 62 is unsecured or released. In many embodiments, positioning the release member 146 can cause the latch member 230 to be maintained in the first position, positioning the release member 146 in the second position can cause the latch member 230 to be maintained in the second position, and positioning the release member 146 in the third position can cause the latch member 230 to be maintained in the third position.

Figure 27:
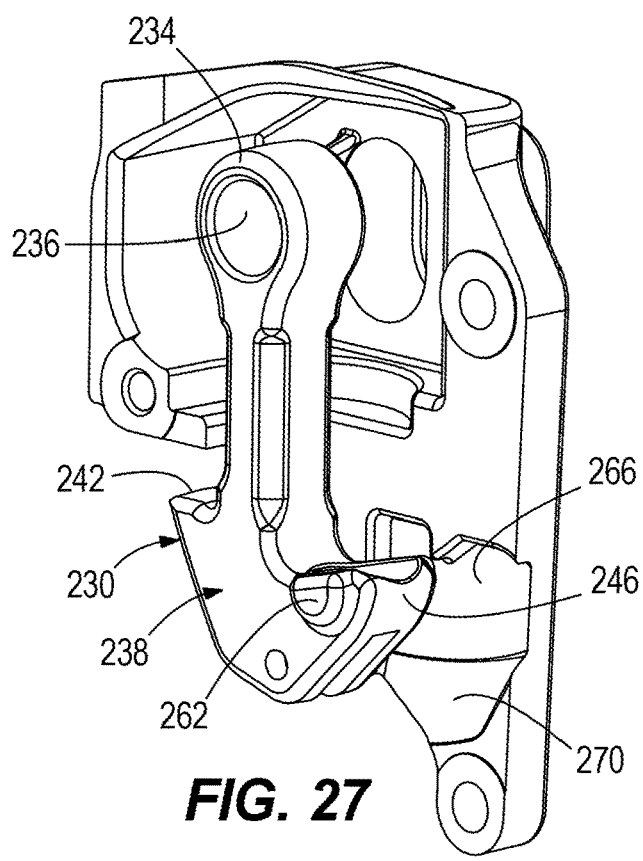
FIGS. 27 and 28 are perspective views of the latching assembly of FIGS. 7 and 8, showing a latch member of the latching assembly configured to engage the battery of FIG. 2.

In the illustrated embodiment, the latch member 230 includes an upper end 234 having an aperture 236 (FIG. 27). The release member 146 extends through the aperture 236, such that the upper end 234 of the latch member 230 is looped over the release member 146. The upper end 234 may act as a bearing, allowing the latch member 230 to rotate and pivot relative to the release member 146 about the axis 150, while also forcing the latch member 230 to move vertically up and down overall with any vertical movement of the release member 146.

Figure 26:
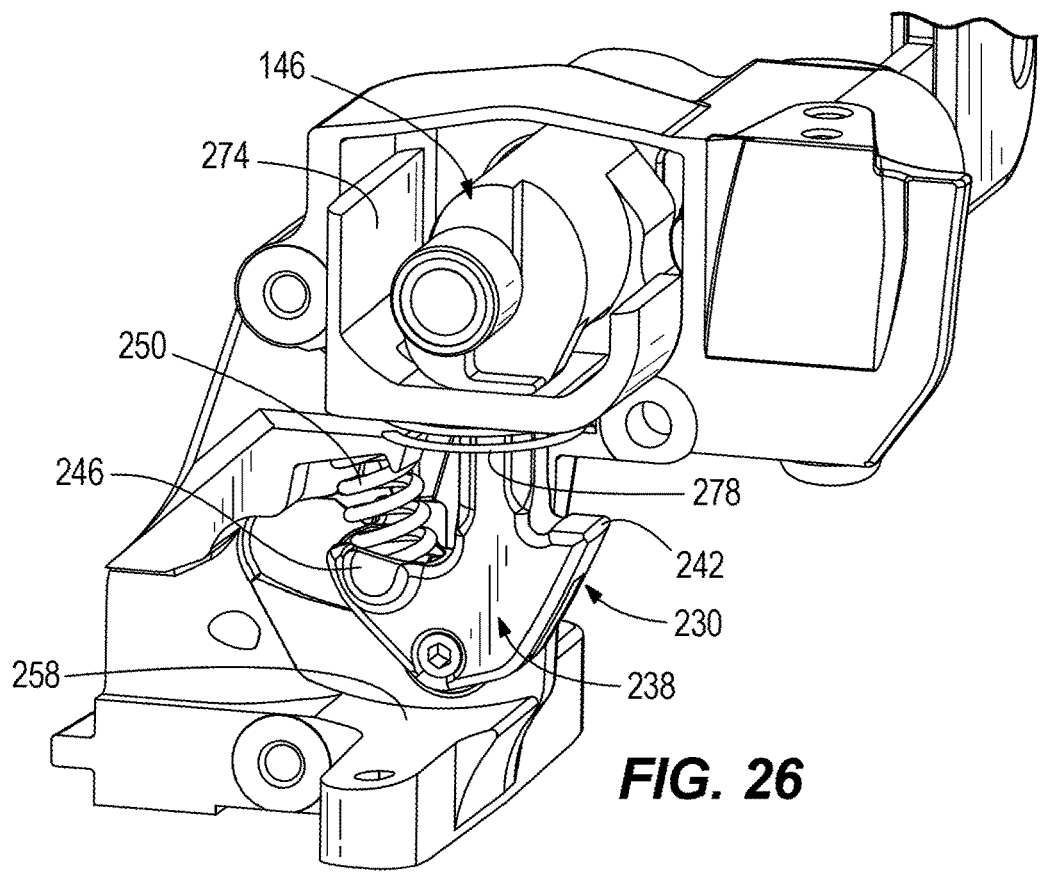
FIG. 26 is perspective view of the latching assembly of FIGS. 7 and 8, with the second outer housing of FIG. 22 removed.

With continued reference to FIGS. 21 and 23-31, the latch member 230 includes a lower end 238 disposed opposite the upper end 234. In the illustrated embodiment the lower end 238 is generally hook-shaped, and includes a first portion 242 configured to engage and disengage with the battery 62, and a second portion 246 coupled to (e.g., receiving) a biasing element 250. With reference to FIG. 26, in the illustrated embodiment the biasing element 250 is a single coiled compression spring. In other embodiments the biasing element 250 may be a plurality of springs, a leaf spring, or another type of biasing element. As illustrated in FIG. 26, the biasing element 250 may be coupled at one end to the second portion 246, and coupled at an opposite end to the first outer housing 142 (and/or the second outer housing 144). In the illustrated embodiment, the biasing element 250 biases the latch member 230 to rotate about the axis 150, and biases the lower end 238 in a rotational direction (i.e., counterclockwise as viewed in FIG. 26) that is identical to the rotational direction of the release member 146 when the release member 146 is being rotated from the first position (e.g., secured position) to the second position (e.g., open position) and from the second position to the third position (e.g., released position).

With continued reference to FIGS. 21 and 23-31, the latch member 230 may include a follower member 254, and the first outer housing 142 and/or the second outer housing 144 may include a cam release surface 258. In the illustrated embodiment, the follower member 254 is a roller rotatably coupled to the lower end 238 of the latch member 230 and the cam release surface 258 is a curved (e.g., arcuate) surface that extends along a portion of the first outer housing 142. As described further below, the follower member 254 may roll along the cam release surface 258 during rotational movement of the latch member 230 from the second position (e.g., open position) to the third position (e.g., released position). Other embodiments may include other types of follower members 254 (e.g., rollers, bearing surfaces, etc.) than that illustrated, as well as other types, sizes, and locations of cam release surfaces 258 (e.g., curved surfaces) than that illustrated. In some embodiments, the first outer housing 142 and/or second outer housing 144 may themselves include a roller or other structure that facilitates sliding, rotational motion of the lower end 238 of the latch member 230.

Figure 28:
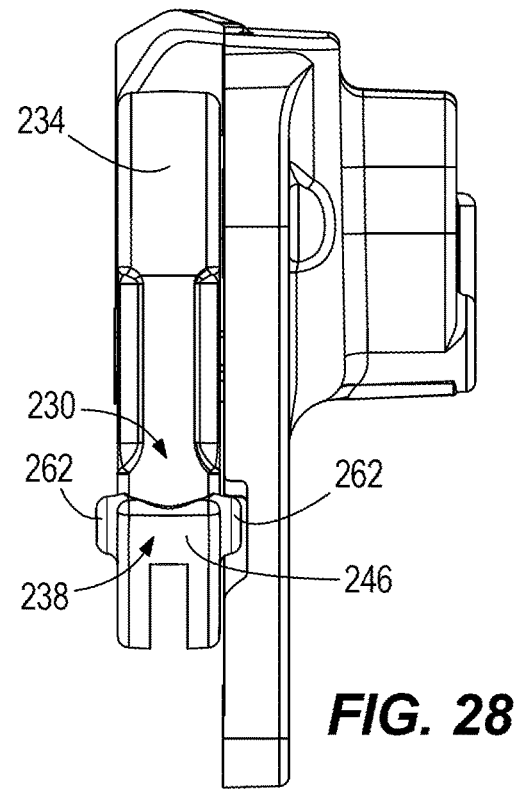

With reference to FIGS. 27 and 28, the lower end 238 itself may additionally include one or more stoppers 262. In the illustrated embodiment the stoppers 262 are protrusions that extend axially away from the lower end 238 along a direction that is perpendicular to the axis 150. The stoppers 262 may inhibit or prevent the latch member 230 from rotating in at least one direction, and may prevent the battery 62 from disengaging from the latch member 230 in the first position (e.g., secured position). As illustrated in FIGS. 27 and 28, the second outer housing 144 may include a recessed area 266 (e.g., notch) that may at least partially receive one of the stoppers 262 to facilitate holding the latch member 230 in place in the third position (e.g., released position), and/or may include an additional cam release surface 270 (e.g., ledge) upon which the stopper 262 slides when the latch member 230 rotates and the follower member 254 is rolling along the cam release surface 258.

With reference to FIG. 26, the battery latching assembly 138 may additionally include a plate 274 positioned underneath the release member 146, and a biasing element 278 that biases the plate 274 vertically upwardly (i.e., away from the lower end 238 of the latch member 230). In the illustrated embodiment the plate 274 is a U-shaped plate, although other embodiments may include various other sizes and shapes than that illustrated. Additionally, in the illustrated embodiment the biasing element 278 is a single compression spring, although other embodiments may include a plurality of springs, a leaf spring, or another type of biasing element. As illustrated in FIG. 26, the biasing element is coupled (e.g., pressed against) a bottom of the plate 274 at one end of the biasing element 278, and is coupled (e.g., pressed against) a surface of the first outer housing 142 at a second, opposite end of the biasing element 278. A portion of the release member 146 sits on top of the plate 274, such that when the release member 146 is rotated from the first position (e.g., secured position) to the second position (e.g., open position), and from the second position to the third position (e.g., release position), the plate 274 is pressed down against the biasing force of the biasing element 278. When the release member 146 is in the first position, the biasing element 278 presses upwardly on the release member 146, holding the release member 146 in an upper position in the oblong-shaped apertures 198, 210, and aligning the recess 182 on the release member 146 with the protrusion 178 on the rotating key member 166.

Figure 29:
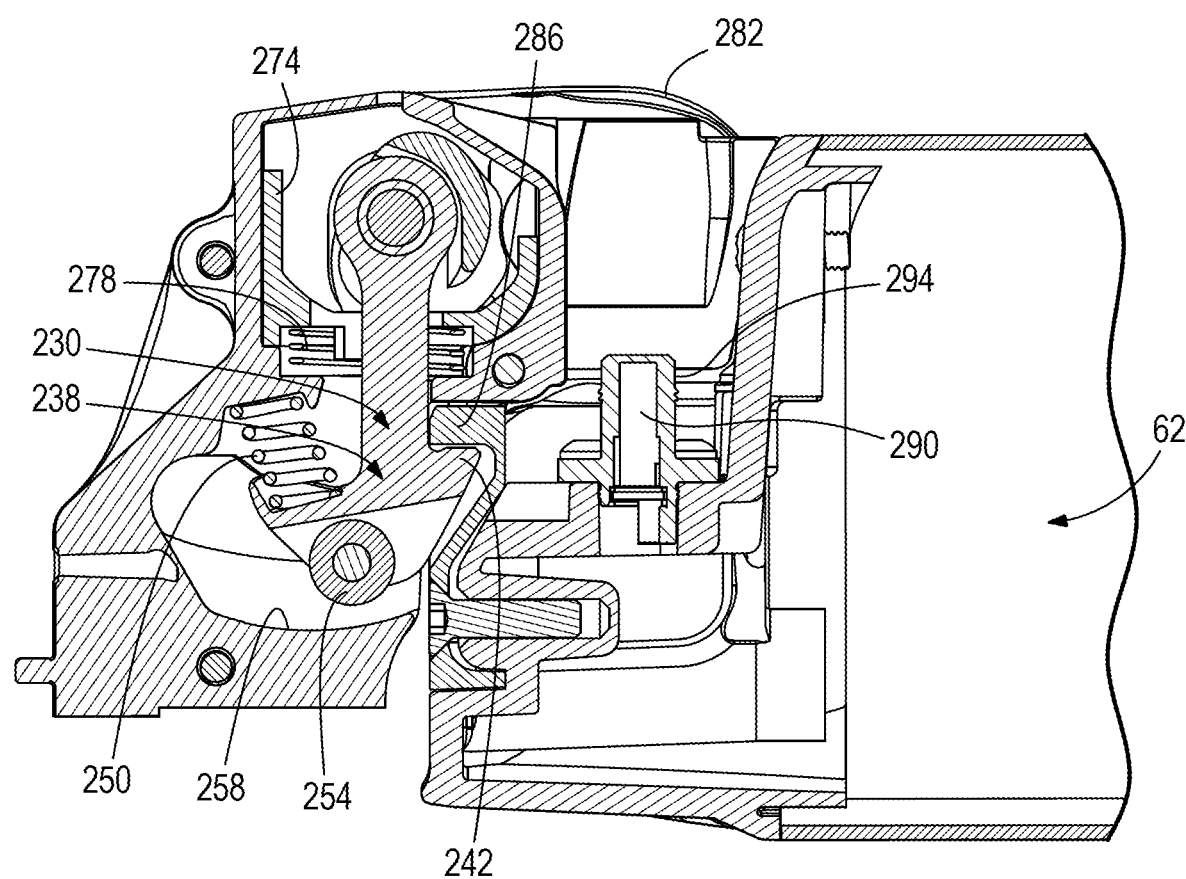
FIG. 29 is a cross-sectional view of the latching assembly of FIGS. 7 and 8 showing the release member of FIGS. 12 and 13 and the latch member of FIGS. 27 and 28 when the latching assembly is in the secured state of FIG. 14, and showing the latch member latched to a catch of the battery of FIG. 2.
Figure 30:
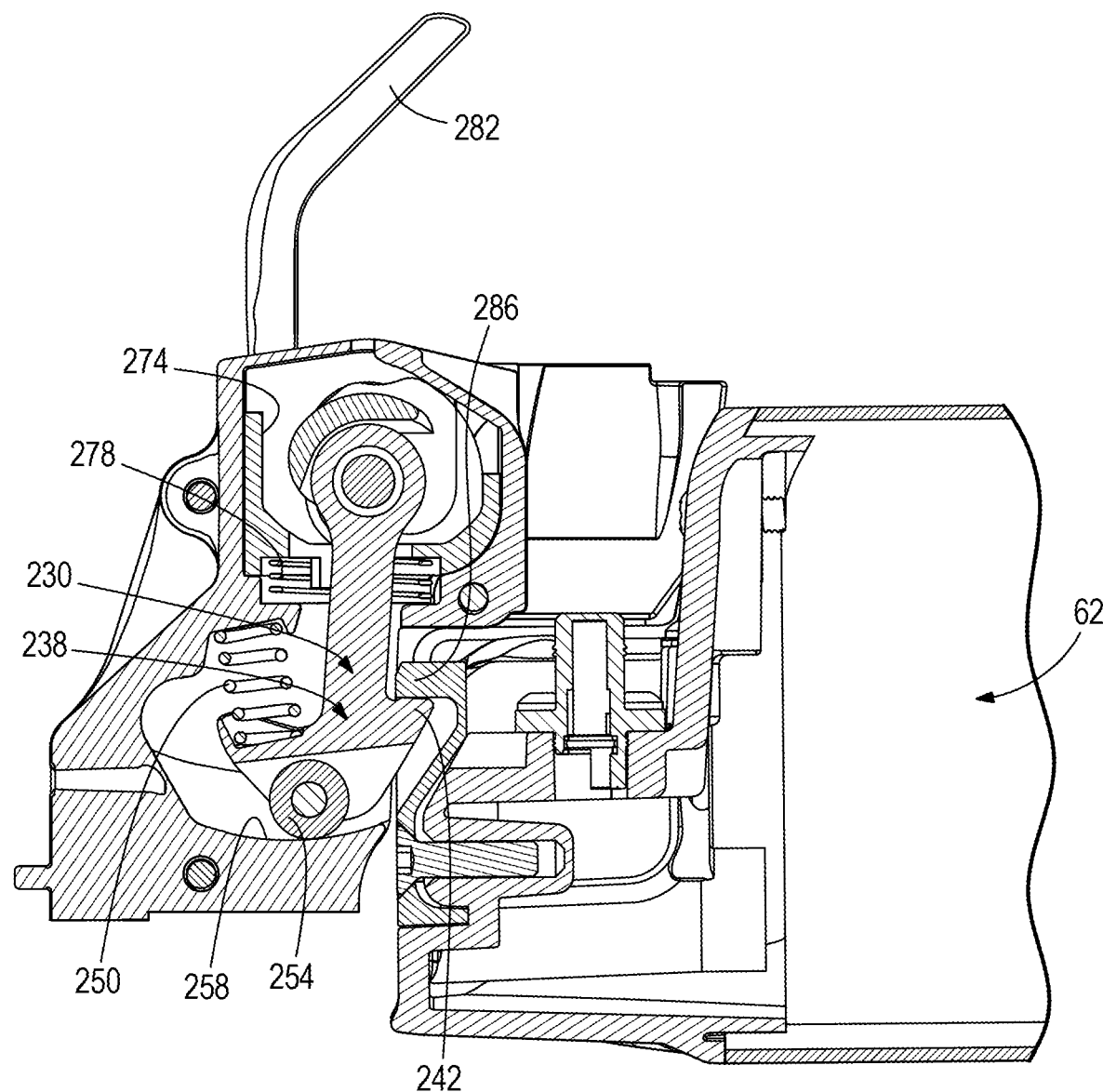
FIG. 30 is a cross-sectional view of the latching assembly of FIGS. 7 and 8 showing the release member of FIGS. 12 and 13 and the latch member of FIGS. 27 and 28 when the latching assembly is in the open state of FIGS. 17 and 18.
Figure 31:
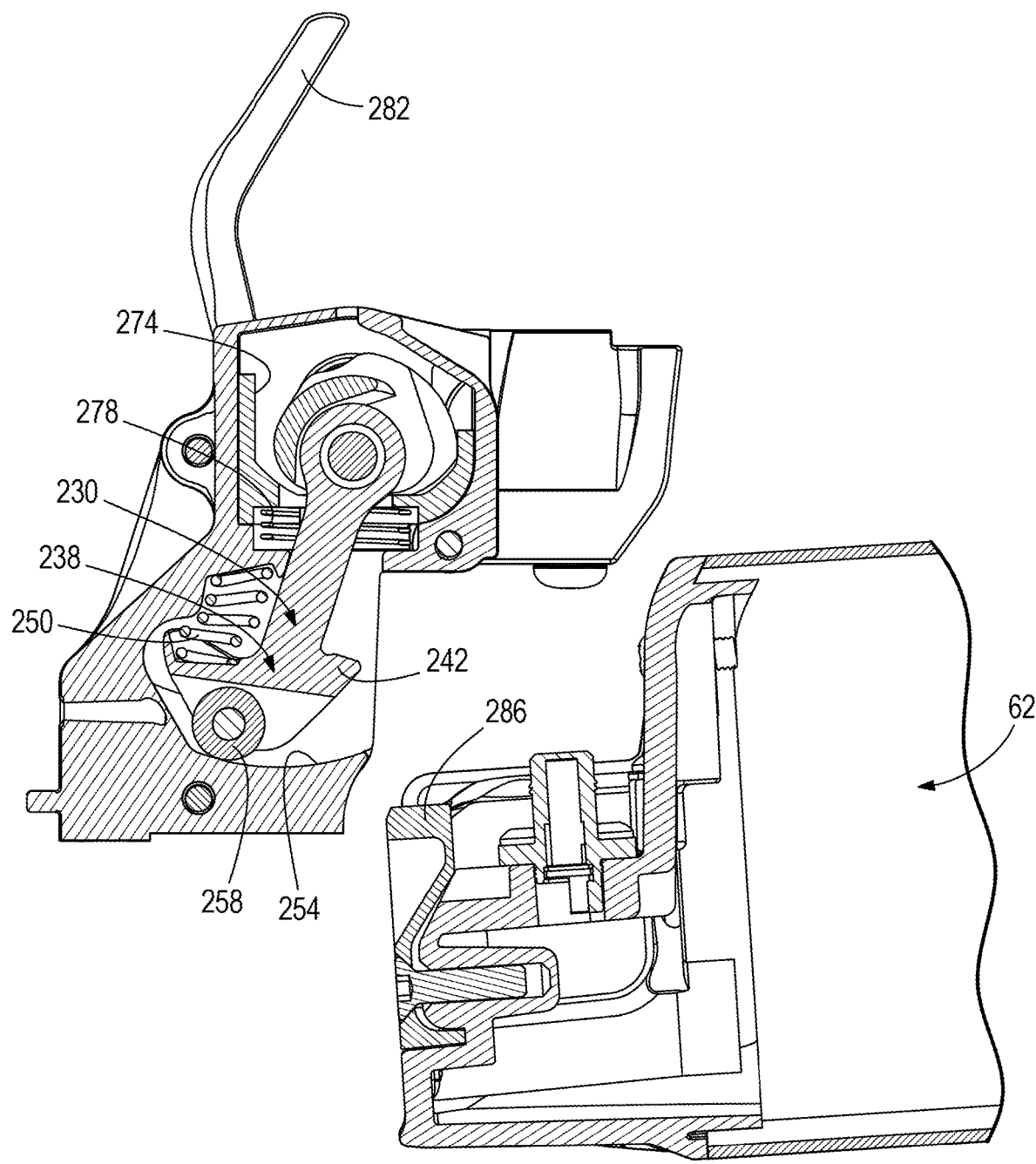
FIG. 31 is a cross-sectional view of the latching assembly of FIGS. 7 and 8 with the release member of FIGS. 12 and 13 and the latch member of FIGS. 27 and 28 when the latching assembly is in the released state of FIGS. 19 and 20.

FIGS. 29-31 illustrate an example of a process of unlatching the battery 62 from the battery latching assembly 138. In a first activity, and as described above, the key 162 is first rotated to unlock the release member 146. In a second activity, a tool 282 (e.g., lever) is inserted into the tool engagement end 154 of the release member 146. As illustrated in FIG. 29, in this position the tool 282 extends horizontally (to the right in FIG. 29). The release member 146 is in the first position (e.g., secured position), and is biased upwardly by the biasing element 278 underneath the plate 274. The latch member 230 is biased (to the right in FIG. 29) with the biasing element 250, such that the first portion 242 of the latch member 230 is engaged (e.g., hooked underneath) a catch 286 of the battery 62, thereby preventing the battery 62 from being released from the down tube 46.

With reference to FIG. 30, the tool 282 may then be rotated (e.g., 90 degrees counterclockwise as viewed in FIGS. 29 and 30), causing the release member 146 to rotate from the first position (e.g., secured position) to the second position (e.g., open position). As illustrated in FIG. 30, and as described above, in the second position the release member 146 has moved vertically down within the oblong-shaped apertures 198, 210, such that the second cam member 190 moves into (e.g., snaps into) the recessed region 202 (e.g., cutout, notch, etc.) of the first outer housing 142 (FIG. 18). In the second position the latch member 230 is still biased (to the right in FIG. 30 with the biasing element 250, such that the first portion 242 of the latch member 230 remains engaged (e.g., hooked underneath) the catch 286.

With reference to FIG. 31, the tool 282 may then be further rotated (e.g., 20 degrees counterclockwise as viewed in FIGS. 30 and 31), causing the release member 146 to rotate from the second position (e.g., open position) to the third position (e.g., released position). As illustrated in FIG. 31, and as described above, in the third position the release member 146 has moved further vertically down within the oblong-shaped apertures 198, 210, due to the pressing action of the second cam member 190 (FIG. 20) and the third cam member 218 (FIG. 25) against surfaces of the first outer housing 142 and the second outer housing 144. In the third position, and as illustrated in FIG. 31, the latch member 230 has translated (moved down) with the release member 146. This vertical movement of the latch member 230 causes the follower member 254 to eventually engage the cam release surface 258, and forces the lower end 238 of the latch member 230 to rotate and slide back away from the battery 62 and the catch 286, thereby freeing the battery 62. The latch member 230 thus translates relative to the first outer housing 142 and the second outer housing 144 (and to the frame assembly 22 overall) when moving from the first position to the second position, and the latch member 230 also rotates when moving from the second position to the third position. In other words, the latch member 230 is movable (via the release member 146) between (1) the first position in which the latch member 230 secures the battery 62 in a fully secured or mounted position, (2) the second position in which the latch member 230 holds the battery 62 in a partially secured or mounted position, and (3) the third position in which the latch member 230 releases the battery 62.

To latch, rather than unlatch, the battery 62 the process may generally be reversed. For example, the release member 146 may first be rotated from the third position as seen in FIG. 31 to the second position as seen in FIG. 30. In the second position, the release member 146 is still free generally to be moved vertically up and down within the oblong-shaped apertures 198, 210. Thus, the second end 70 of the battery 62 may be pivoted and snapped up and over first portion 242, forcing the latch member 230 to momentarily pivot back (i.e., to the left in FIG. 30) before being biased back to the position in FIG. 30, where the first portion 242 is secured underneath the catch 286. During this movement the release member 146 also rises and falls vertically. Once the first portion 242 is secured underneath the catch 286, the release member 146 may then be rotated to the first position seen in FIG. 29. Once in the first position, the key 162 may then be rotated to move the protrusion 178 into the recess (FIG. 14), thereby locking the release member 146 in place.

With reference to FIG. 29, in some embodiments the second end 70 of the battery 62 may include a first electrical connector 290, and the battery latching assembly 138 (or other part of frame assembly 22 or motor assembly 42) may include a second electrical connector 294. When the battery 62 is fully latched, the first electrical connector 290 may align and engage with the second electrical connector 294, to provide power from the battery 62 to the motor assembly 42. To facilitate alignment a rigid fin or fins may be provided on the battery 62 and/or the battery latching assembly 138 (or other part of frame assembly 22 or motor assembly 42). Additionally or alternatively, a post with a diameter may be provided (e.g., on the battery) that fits into an aperture (e.g., on the battery latching assembly 138) with a conical portion at one end having a diameter larger than the diameter of the post. Other embodiments may include various other types of alignment features (e.g., fins, posts, protrusions, recesses, etc.).

In many embodiments, configuring the battery latching assembly 138 so that the battery latching assembly 138 can be placed in the second state (e.g., the open state) as an intermediate state between the first state (e.g., the secured state) and the third state (e.g., the released state) can be advantageous to maintain the battery 62 in a partially secured or mounted state so that the first electrical connector 290 can be eased into electrical contact with the second electrical connector 294 as the battery latching assembly 138 is placed in the first state. As a result, damage to the first electrical connector 290 and/or the second electrical connector 294 can be mitigated or avoided. Likewise, implementing the second state as an intermediate state also can prevent the battery 62 from being unintentionally fully released.

Various features and advantages of the disclosure are set forth in the following claims.

The invention claimed is:

1. An ebike comprising:
   a front wheel and a rear wheel;
   a frame assembly supported on the front wheel and the rear wheel;
   a battery configured to be coupled to the frame assembly; and
   a battery latching assembly configured to secure the battery to the frame assembly, the battery latching assembly comprising:
      a latch member movable among:
         a secured position in which the latch member is configured to secure the battery in a fully mounted position;
         an open position in which the latch member is configured to maintain the battery in a partially mounted position; and
         a released position in which the latch member is configured to release the battery; and
      a release member coupled to the latch member and movable among:
         a first position in which the latch member is maintained in the secured position;
         a second position in which the latch member is maintained in the open position; and
         a third position in which the latch member is maintained in the released position.

2. An ebike as claimed in claim 1, wherein the release member comprises a first cam member and a second cam member extending axially from the first cam member.

3. An ebike as claimed in claim 2, wherein the second cam member has a first shape, and wherein the release member further comprises a third cam member extending axially from the first cam member opposite the second cam member and having a second shape different from the first shape.

4. An ebike as claimed in claim 1, wherein the battery includes a catch configured to receive the latch member when the latch member is in the secured position.

5. An ebike as claimed in claim 1, wherein the frame assembly includes a hook and the battery includes a pivot configured to engage with the hook, the hook including a free end with an upward sweep.

6. An ebike as claimed in claim 5, wherein the upward sweep is at an angle of at least 45 degrees relative to a horizontal plane.

7. An ebike as claimed in claim 5, wherein the pivot includes a non-cylindrical outer surface configured to limit rotation of the pivot relative to the hook.

8. An ebike as claimed in claim 1, wherein the release member is configured to rotate relative to the frame assembly in a first rotational direction when moving from the first position to the second position, and wherein the release member is configured to rotate relative to the frame assembly in the first rotational direction when moving from the second position to the third position.

9. An ebike as claimed in claim 1, wherein the frame assembly includes a cam release surface, wherein the latch member includes a follower member, and wherein the follower member is configured to engage the cam release surface when the latch member moves from the open position to the released position.

10. An ebike as claimed in claim 9, wherein the follower member includes a roller configured to engage with the cam release surface.

11. An ebike as claimed in claim 1, wherein the latch member is configured to translate relative to the frame assembly when moving from the secured position to the open position, and wherein the latch member is configured to both rotate and translate when moving from the open position to the released position.

12. An ebike as claimed in claim 1, wherein the battery latching assembly further comprises a plate and a biasing member configured to press the plate into contact with the release member.

13. An ebike as claimed in claim 12, wherein the release member comprises a cam member configured to press on the plate and compress the biasing member when the release member is positioned in the second position.

14. An ebike comprising:
   a front wheel and a rear wheel;
   a frame assembly supported on the front wheel and the rear wheel, the frame assembly including a hook including a free end with an upward sweep;
   a battery including a pivot configured to engage with the hook, wherein the pivot is positioned at an upper end of the battery.

15. An ebike as claimed in claim 14, wherein the upward sweep is at an angle of at least 45 degrees relative to horizontal.

16. An ebike as claimed in claim 14, wherein the pivot includes a non-cylindrical outer surface configured to limit rotation of the pivot relative to the hook.

17. An ebike as claimed in claim 16, wherein the non-cylindrical outer surface comprises an oblong shape.

18. An ebike as claimed in claim 17, wherein the hook comprises a throat width, and wherein the oblong shape has a maximum width greater than the throat width and a minimum width less than the throat width.

19. An ebike as claimed in claim 14, further comprising a battery latching assembly securing the battery to the frame assembly, the battery latching assembly comprising:
   a latch member movable among:
      a secured position in which the latch member is configured to secure the battery in a fully mounted position;

an open position in which the latch member is configured to maintain the battery in a partially mounted position; and a released position in which the latch member is configured to release the battery; and a release member coupled to the latch member and movable among:

a first position in which the latch member is maintained in the secured position;

a second position in which the latch member is maintained in the open position; and a third position in which the latch member is maintained in the released position.

20. An ebike as claimed in claim 19, wherein the release member includes a tool engagement end, wherein the battery latching assembly further includes a lever configured to be coupled to the tool engagement end, wherein the lever is configured to be rotated to rotate the release member between the secured position, the open position, and the released position.

21. An ebike as claimed in claim 19, wherein the release member includes a recess, wherein the battery latching assembly further includes a rotating key member with a protrusion configured to move into and out of the recess to lock and unlock the release member.

\* \* \* \* \*